US012766889B2

(12) United States Patent
Amimoto

(10) Patent No.: US 12,766,889 B2
(45) Date of Patent: Oct. 20, 2026

(54) PNEUMATIC TIRE

(71) Applicant: Toyo Tire Corporation, Itami (JP)

(72) Inventor: Hiroki Amimoto, Itami (JP)

(73) Assignee: Toyo Tire Corporation, Itami (JP)

( * ) Notice: Subject to any disclaimer, the term of this patent is extended or adjusted under 35 U.S.C. 154(b) by 0 days.

(21) Appl. No.: 19/238,822

(22) Filed: Jun. 16, 2025

(65) Prior Publication Data

US 2026/0014819 A1 Jan. 15, 2026

(30) Foreign Application Priority Data

Jul. 11, 2024 (JP) ................................ 2024-111477
Jul. 11, 2024 (JP) ................................ 2024-111487

(51) Int. Cl.
*B60C 11/11* (2006.01)
*B60C 11/13* (2006.01)
*B60C 11/03* (2006.01)

(52) U.S. Cl.
CPC ........... *B60C 11/1353* (2013.01); *B60C 11/11* (2013.01); *B60C 11/1315* (2013.01); *B60C 2011/0381* (2013.01); *B60C 2011/1338* (2013.01); *B60C 2011/1361* (2013.01)

(58) Field of Classification Search
CPC . B60C 11/1353; B60C 11/1315; B60C 11/11; B60C 2011/1361; B60C 2011/0381; B60C 2011/1338
See application file for complete search history.

(56) References Cited

U.S. PATENT DOCUMENTS

| | | | | | |
|---|---|---|---|---|---|
| 3,727,661 | A * | 4/1973 | Hoke | B60C 11/032 152/209.22 |
| D884,588 | S * | 5/2020 | Sato | D12/579 |
| D1,062,589 | S * | 2/2025 | Sato | D12/579 |
| 2002/0092591 | A1* | 7/2002 | Cortes | B60C 11/0309 152/209.16 |
| 2015/0306918 | A1* | 10/2015 | Kuwano | B60C 11/045 152/209.22 |
| 2015/0343849 | A1 | 12/2015 | Tanaka et al. | |
| 2021/0387478 | A1 | 12/2021 | Nakajima et al. | |
| 2024/0149620 | A1* | 5/2024 | Ono | B60C 11/01 |

FOREIGN PATENT DOCUMENTS

| | | | | |
|---|---|---|---|---|
| GB | 1549347 A * | 8/1979 | B60C 11/1392 |
| JP | 2003-170704 A * | 6/2003 | B60C 11/1384 |
| JP | 2011-178346 A * | 9/2011 | |
| JP | 2016-5950 A | 1/2016 | |
| JP | 2021-195049 A | 12/2021 | |

OTHER PUBLICATIONS

Machine translation for Japan 2011-178346 (Year: 2025).*
Machine translation for Japan 2003-170704 (Year: 2025).*

* cited by examiner

*Primary Examiner* — Steven D Maki
(74) *Attorney, Agent, or Firm* — WHDA, LLP

(57) ABSTRACT

In a pneumatic tire, a first center block includes a slit that extends from a shoulder main groove and terminates in the block, and a protruding portion that protrudes from a portion adjacent to the slit. The protruding portion protrudes toward the outside of the block beyond a block end on an opposite side of the slit. The shoulder main groove is formed with a groove bottom protrusion in which a groove bottom is raised from a portion adjacent to an opening portion of the slit so as to connect to the protruding portion.

13 Claims, 20 Drawing Sheets

PNEUMATIC TIRE

CROSS REFERENCE TO RELATED APPLICATION

The entire disclosure of Japanese Patent Applications No. 2024-111477 filed on Jul. 11, 2024, and No. 2024-111487 filed on Jul. 11, 2024, including the specification, claims, drawings, and abstract, is incorporated herein by reference in its entirety.

TECHNICAL FIELD

The present disclosure relates to a pneumatic tire.

BACKGROUND

Conventionally, a pneumatic tire provided with a tread pattern including a circumferential groove extending in the tire circumferential direction, a lateral groove extending in the tire axial direction, and a plurality of blocks divided by the grooves, has been widely known (refer to JP 2021-195049 A, for example).

The tire of JP 2021-195049 A is a tire provided with a plurality of protrusions at the bottom of the circumferential groove and designed to improve performance on snowy roads. Note that a tire provided with a plurality of blocks divided by the circumferential groove and the lateral groove is used as a mud-terrain tire (hereinafter referred to as "MT tire") suitable for off-road driving on muddy roads, rocky terrain, and the like.

SUMMARY

With MT tires, since it is necessary to improve traction performance on muddy roads, rocky terrain, and the like, for example, part of each block is formed with a portion protruding outward from the block to increase the number of engagements with mud, rocks, and the like. However, when a block is provided with such a protruding portion, the block rigidity is locally suppressed at the protruding portion, which makes the block more susceptible to uneven wear.

A pneumatic tire according to the present disclosure is a pneumatic tire provided with a tread pattern including first and second blocks having mutually different shapes and a groove dividing the blocks, the first block including a slit that extends from the groove and terminates in the block, and a protruding portion that protrudes from a portion adjacent to the slit toward the outside of the block beyond a block end on an opposite side of the slit, and the groove is formed with a groove bottom protrusion in which a groove bottom is raised from a portion adjacent to an opening portion of the slit so as to connect to the protruding portion.

With the pneumatic tire according to the present disclosure, it is possible to effectively suppress uneven wear of blocks constituting a tread pattern. According to the present disclosure, it is possible to provide a pneumatic tire that exhibits excellent traction performance while effectively suppressing uneven wear of blocks.

BRIEF DESCRIPTION OF DRAWINGS

Embodiment(s) of the present disclosure will be described based on the following figures, wherein.

DESCRIPTION OF EMBODIMENTS

An example of an embodiment of a pneumatic tire according to the present disclosure will be described below in detail with reference to the accompanying drawings. The embodiment described below is merely exemplary, and the present disclosure is not limited to the embodiment below. Moreover, configurations formed by selectively combining constituent components of the embodiment described below are included within the scope of the present disclosure.

Figure 1:
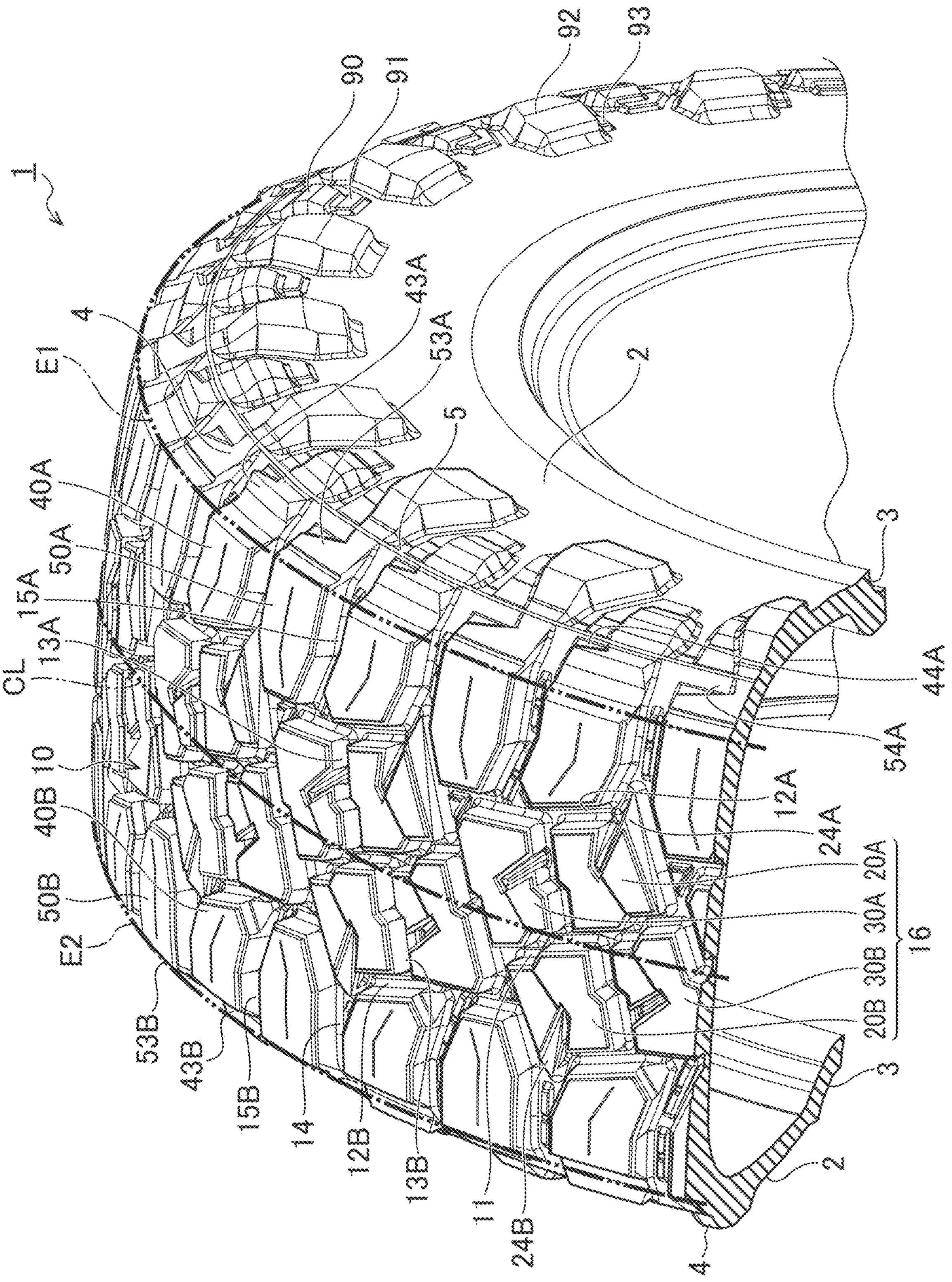
FIG. 1 is a perspective view of a pneumatic tire as an example of an embodiment.

FIG. 1 is a perspective view of a pneumatic tire 1 as an example of the embodiment. As illustrated in FIG. 1, the pneumatic tire 1 includes a tread 10 as a portion that comes into contact with the road surface, a pair of sidewalls 2, a pair of beads 3 as portions that are fixed to the rim of a wheel, and a pair of buttress regions 4. Each buttress region 4 is a portion positioned between the tread 10 and the corresponding sidewall 2 and also referred to as a shoulder region. The sidewalls 2, the bead 3, and the buttress regions 4 extend inward in the tire radial direction from the left and right ends of the tread 10, thereby forming tire side surfaces.

In the present embodiment, the buttress regions 4 are defined to be regions of the pneumatic tire 1 from ground contact ends E1 and E2 to side ribs 5. In other words, the ground contact ends E1 and E2 each define the boundary between the tread 10 and the corresponding buttress region 4, and the side ribs 5 each define the boundary between the corresponding sidewall 2 and the corresponding buttress region 4. The side ribs 5 are protrusions formed in annular shapes continuously in the tire circumferential direction on the left and right tire side surfaces. Note that, for convenience of description, the right side on the sheet of FIG. 1 is defined as the right side of the pneumatic tire 1, and the left side on the sheet of FIG. 1 is defined as the left side of the pneumatic tire 1. In addition, the outer side of the tread 10 in the tire radial direction is defined as an upper side, the inner side in the tire radial direction is defined as a lower side, and a surface of a block or the like facing the outer side in the tire radial direction is defined as an upper surface.

The ground contact ends E1 and E2 of the pneumatic tire 1 are defined to be respective ends of a region (contact area) in the tire axial direction, the contact area coming into contact with a flat road surface when a new tire is mounted on a standard rim, inflated to a standard internal pressure, and subjected to a predetermined load. The predetermined load is a load equivalent to 88% of a standard load. In the present embodiment, the ground contact ends E1 and E2 are respective outer ends of the contact areas of second shoulder blocks 50A and 50B, to be described, later in the tire axial direction.

The "standard rim" is a rim defined by tire standards and corresponds to a "standard rim" in the case of JATMA and to a "Measuring Rim" in the cases of TRA and ETRTO. The "standard internal pressure" corresponds to "maximum air pressure" in the case of JATMA, the maximum value listed in the "TIRE LOAD LIMITS AT VARIOUS COLD INFLATION PRESSURES" table in the case of TRA, and the "INFLATION PRESSURE" in the case of ETRTO. The "standard load" corresponds to the "maximum load capacity" in the case of JATMA, the maximum value listed in the "TIRE LOAD LIMITS AT VARIOUS COLD INFLATION PRESSURES" table in the case of TRA, and the "LOAD CAPACITY" in the case of ETRTO.

The pneumatic tire 1 is preferable as a mud-terrain tire (MT tire) suitable for off-road driving on muddy road, rocky terrain, sandy surfaces, and the like, or as a rugged terrain tire (RT tire). As described later in detail, the pneumatic tire 1 exhibits excellent traction performance, has an aggressive appearance, and provides excellent durability, drainage performance, and quietness. The pneumatic tire 1 is mounted on, for example, a light truck such as a pickup truck or a sport utility vehicle (SUV).

The pneumatic tire 1 is a point-symmetric tire that has no specified direction of mounting on a vehicle and has the same tread pattern and tire side surface shape regardless of the direction of mounting on a vehicle. The tread pattern and tire side surface shape of the pneumatic tire 1 are rotationally symmetrical through 180° between the left and right sides of a tire equator CL. The equator CL is a virtual line extending in the tire circumferential direction and passing through the center of the tread 10 in the tire axial direction.

The pneumatic tire 1 is provided with a tread pattern including a plurality of blocks and a groove dividing the blocks. The tread 10 is formed with a center main groove 11 and shoulder main grooves 12A and 12B (tire circumferential grooves) extending in the tire circumferential direction. The tread 10 is also formed with lateral grooves 13A, 13B, 14, 15A, and 15B extending in the tire axial direction. In the present embodiment, a region sandwiched between the two shoulder main grooves 12A and 12B is defined as a "center region" of the tread 10. In addition, a region from the shoulder main groove 12A to the ground contact end E1 and a region from the shoulder main groove 12B to the ground contact end E2 are defined as "shoulder regions" of the tread 10. Note that the blocks of the tread 10 are projections extending outward in the tire radial direction and may be referred to as land portions in the tire industry.

In the center region of the tread 10, a plurality of block groups 16, each consisting of four of first center blocks 20A and 20B and second center blocks 30A and 30B, are disposed in the tire circumferential direction. The block groups 16 adjacent to each other in the tire circumferential direction are divided by a lateral groove 14 extending to the left and right shoulder regions across the center region, and are disposed at a predetermined interval in the tire circumferential direction. The predetermined interval may be an equal pitch, but from the perspective of improving quietness, is preferably a variable pitch (non-uniform interval) that varies in the tire circumferential direction. The variable pitch is set, for example, in length units corresponding to the half of the length of each block group 16 in the tire circumferential direction and has a pitch cycle of 40 to 50.

The above-described four center blocks constituting each block group 16 are blocks disposed closer to the equator CL than to the ground contact ends E1 and E2 and partitioned by the center main groove 11 and the lateral grooves 13A and 13B (first lateral grooves). As described later in detail, the center main groove 11 includes a straight region longitudinally traversing each block group 16 in the tire circumferential direction and straightly connecting two lateral grooves 14 (second lateral grooves). On the other hand, the two lateral grooves 13A and 13B are disposed slightly offset in the tire circumferential direction and not positioned on the same straight line. The lateral groove 13A connects the center main groove 11 and the shoulder main groove 12A, and the lateral groove 13B connects the center main groove 11 and the shoulder main groove 12B.

The first center block 20A is entirely disposed on the ground contact end E1 side of the equator CL, and the first center block 20B is entirely disposed on the ground contact end E2 side of the equator CL. The first center block 20A includes a protruding portion 24A that protrudes toward the ground contact end E1, and the first center block 20B includes a protruding portion 24B protruding toward the ground contact end E2. The protruding portions 24A and 24B protrude in opposite directions from each other and contribute significantly to improvement of traction performance on muddy roads, rocky terrain, sandy surfaces, and the like. The first center blocks 20A and 20B have the same shape as each other although the orientations of the blocks differ by 180°.

The second center block 30A is mostly disposed on the ground contact end E1 side of the equator CL but partially disposed on the ground contact end E2 side beyond the equator CL. The second center block 30B is mostly disposed on the ground contact end E2 side of the equator CL but partially disposed on the ground contact end E1 side beyond the equator CL. In other words, the second center blocks 30A and 30B are disposed such that parts of the blocks overlap in the tire circumferential direction. The second center blocks 30A and 30B have the same shape as each other although the orientations of the blocks differ by 180°.

In the shoulder region on the right side of the tread 10, a first shoulder block 40A and the second shoulder block 50A having mutually different shapes are alternately arranged in the tire circumferential direction. The first shoulder block 40A and the second shoulder block 50A are divided by the lateral grooves 14 and 15A alternately formed in the tire circumferential direction. Similarly, in the shoulder region on the left side of the tread 10, a first shoulder block 40B and the second shoulder block 50B are alternately arranged in the tire circumferential direction, and the two kinds of blocks are divided by the lateral grooves 14 and 15B.

The first shoulder block 40A and the second shoulder block 50A are different from each other in the shapes of sidewalls 43A and 53A facing outward in the tire axial direction. The first sidewall 43A of the first shoulder block 40A is more deeply recessed in an outer portion in the tire radial direction than the second sidewall 53A of the second shoulder block 50A, whereas an inner portion in the tire radial direction protrudes more significantly. With the difference in the protrusion shapes of the sidewalls 43A and 53A of the shoulder blocks, irregularities in the tire circumferential direction are formed in the buttress regions 4 to exhibit excellent traction performance during off-road driving on muddy roads, rocky terrain, sandy surfaces, and the like.

In addition, recessed portions 44A and 54A that are opened toward the same side in the tire circumferential direction are formed on the sidewall 43A of the first shoulder block 40A and the sidewall 53A of the second shoulder block 50A, respectively. The recessed portions 44A and 54A contribute further improvement of traction performance and further enhance an aggressive impression. Note that the first shoulder blocks 40A and 40B have the same shape as each other although the orientations of the blocks differ by 180°. Similarly, the second shoulder blocks 50A and 50B have the same shape as each other although the orientations of the blocks differ by 180°.

Conventionally well-known rubber composition and internal structure may be applied to the pneumatic tire 1. The pneumatic tire 1 includes, for example, a carcass, a belt, and a cap ply. The carcass is a cord layer covered with rubber and serves as the framework of the tire, withstanding loads, impacts, internal pressure, and the like. The carcass is constituted by two carcass plies and has a radial structure in which a carcass code is disposed in a direction orthogonal to the tire circumferential direction. An inner liner that is a rubber layer for retaining internal pressure is provided inside the carcass. The belt is a reinforcing band disposed between a rubber constituting the tread 10 and the carcass.

Characters, numbers, symbols, and the like, which are referred to as serials, may be provided on the sidewalls 2. The serials include information such as a size code, a manufacturing date (year and week of manufacture), and a manufacturing place (manufacturing factory code). In addition, a plurality of side blocks 90, 91, 92, and 94 are formed on the sidewalls 2. With the side blocks, the pneumatic tire 1 achieves improved traction performance, side-cut performance, and the like, as well as a more aggressive design.

Figure 2:
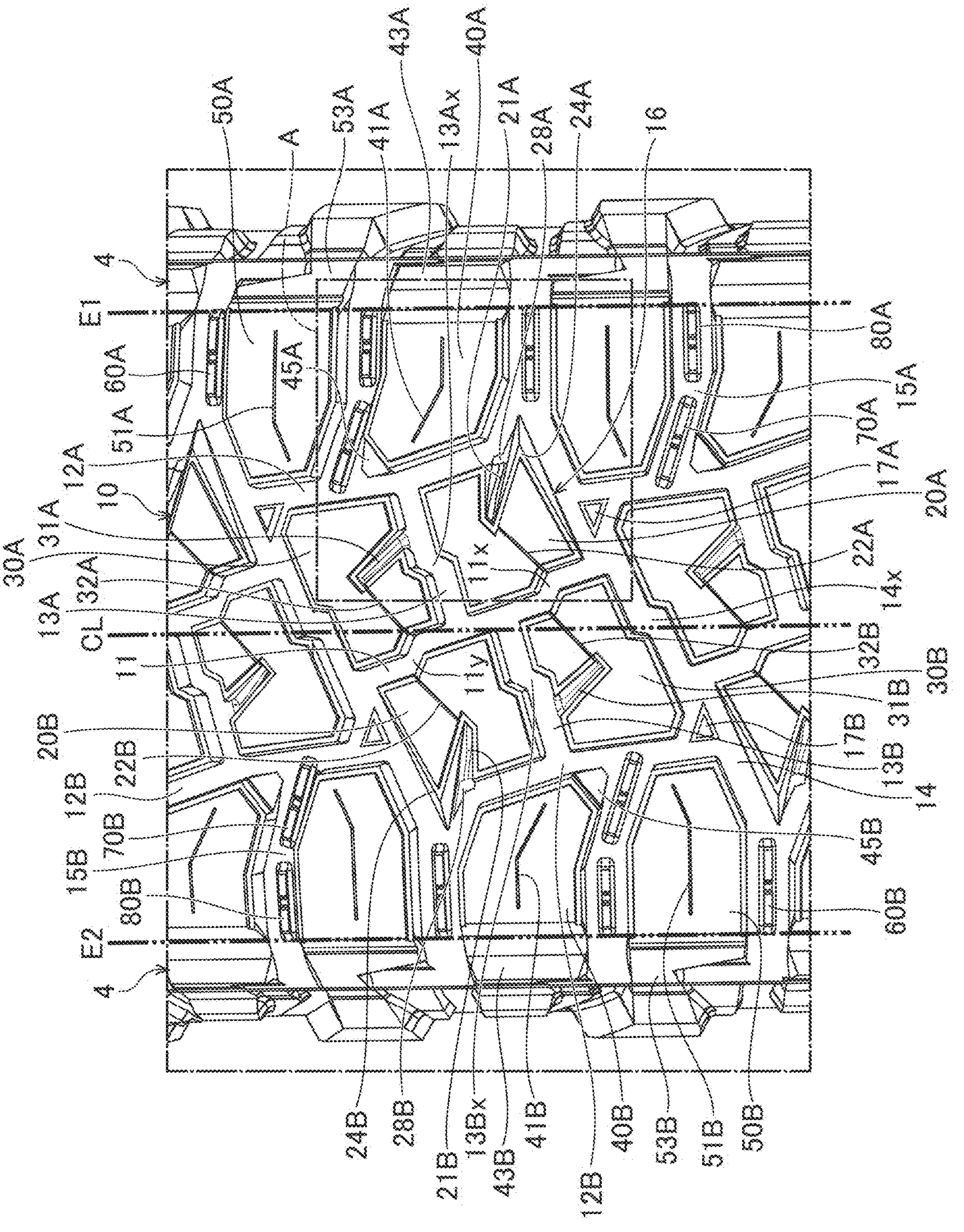
FIG. 2 is a plan view of the pneumatic tire as an example of the embodiment, illustrating part of a tread in an enlarged manner.
Figure 3:
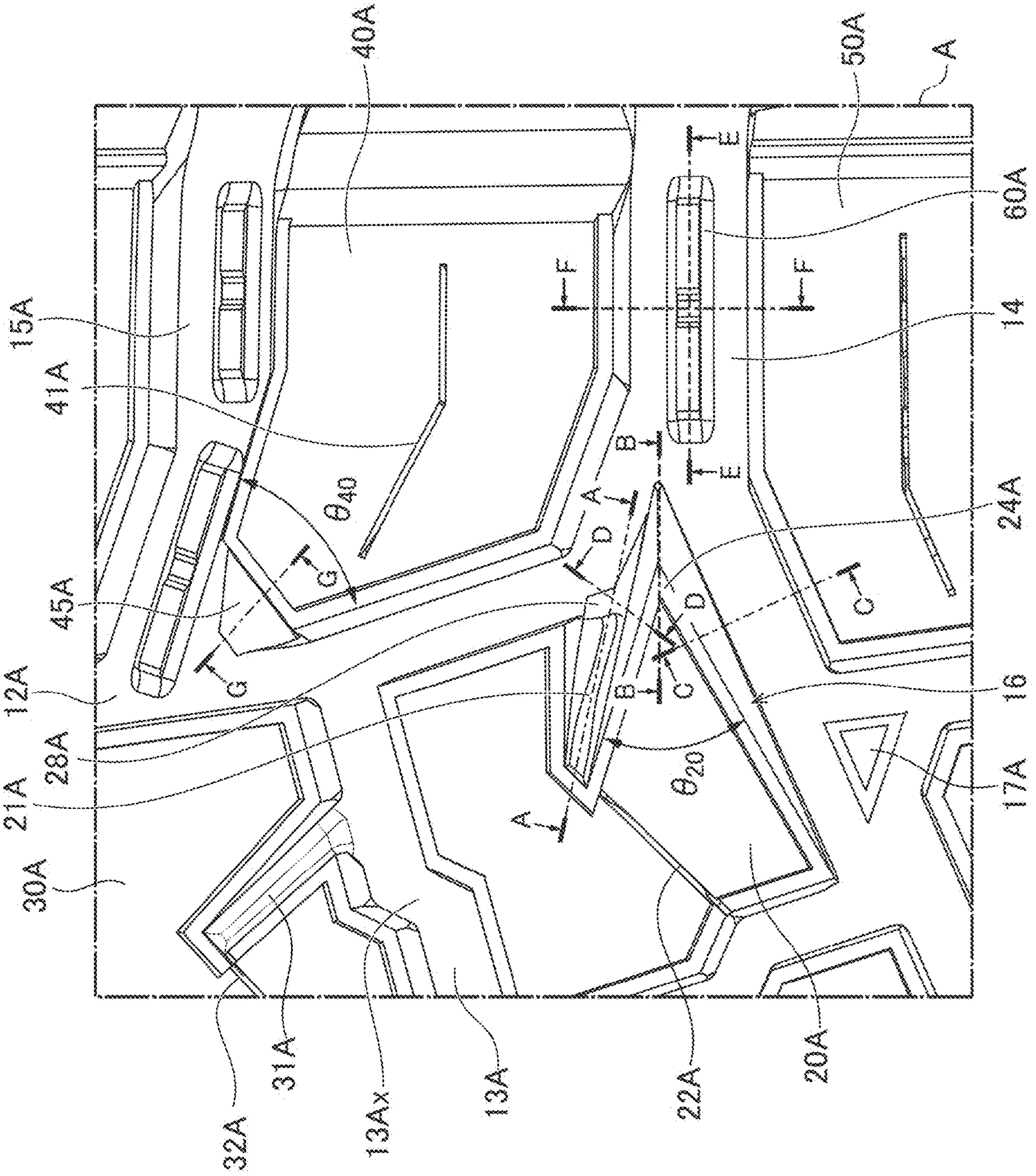
FIG. 3 is an enlarged view of part A in FIG. 2.

A tread pattern of the pneumatic tire 1 will be described below in detail with reference to FIGS. 2 and 3. FIG. 2 is a plan view of the pneumatic tire 1, illustrating part of the tread 10 in an enlarged manner. In FIG. 2, from the perspective of clarity of the drawing, curved surfaces such as block sidewalls are omitted from illustration, and some components are schematically illustrated. FIG. 3 is an enlarged view of part A in FIG. 2, illustrating cut lines of cross-sectional views to be described later.

As illustrated in FIGS. 2 and 3, the tread 10 includes the center region in which the plurality of block groups 16 are disposed in the tire circumferential direction, and the shoulder regions in which the two kinds of shoulder blocks are alternately arranged in the tire circumferential direction. As described above, each block group 16 includes four blocks in total, namely, the two first center blocks 20A and 20B and the two second center blocks 30A and 30B. In other words, each block group 16 includes two blocks of each of two kinds having mutually different shapes. The outline of each block group 16 has a substantially rectangular shape in a plan view, and the first center blocks 20A and 20B are disposed on a first diagonal line of the rectangle. The second center blocks 30A and 30B are disposed on a second diagonal line of the rectangle.

The outline of each block group 16 is formed by the shoulder main grooves 12A and 12B and two lateral grooves 14. The shoulder main grooves 12A and 12B are tilted relative to the tire circumferential direction and the lateral grooves 14 are tilted relative to the tire axial direction, and accordingly, the sides of the above-described rectangle of each block group 16 are tilted relative to the tire circumferential direction and axial direction. As for the two blocks positioned on the ground contact end E1 side among the four center blocks constituting each block group 16, the first center block 20A is disposed on the ground contact end E1 side of the second center block 30A. As for the two blocks positioned on the ground contact end E2 side, the first center block 20B is disposed on the ground contact end E2 side of the second center block 30B.

Similarly to the shoulder main grooves 12A and 12B, the center main groove 11 longitudinally traversing each block group 16 and connecting two lateral grooves 14 is tilted relative to the tire circumferential direction. The center main groove 11 is significantly curved along its path and includes bent portions 11*x* and 11*y* at two places. The bent portions 11*x* and 11*y* angulate the center blocks. This increases the number of block engagements with mud, rocks, and the like, thereby improving traction performance on muddy roads, rocky terrain, sandy surfaces, and the like. On the other hand, the bent portions 11*x* and 11*y* are disadvantageous in terms of drainage performance, but favorable drainage performance can be ensured by providing the above-described straight regions. The center main groove 11 is formed across the equator CL at a central portion in the length direction.

The lateral grooves 13A and 13B are connected to the center main groove 11 substantially on the equator CL. In this case, favorable drainage performance and traction performance are obtained in the vicinity of the equator CL as well. The lateral grooves 13A and 13B are tilted in the same direction as the lateral grooves 14 relative to the tire axial direction. Similarly to the center main groove 11, each of the lateral grooves 13A and 13B is significantly curved along its path and includes a bent portion 13Ax or 13Bx at one place. Similarly to the bent portions 11*x* and 11*y* of the center main groove 11, the bent portions 13Ax and 13Bx angulate the center blocks, thereby contributing to improvement of traction performance on muddy road, rocky terrain, sandy surfaces, and the like.

The tread 10 includes the first shoulder block 40A and the second shoulder block 50A at positions facing each block group 16 in the tire axial direction with the shoulder main groove 12A in between. In addition, the first shoulder block 40B and the second shoulder block 50B are provided at positions facing each block group 16 in the tire axial direction with the shoulder main groove 12B in between. The shoulder main groove 12A connects two lateral grooves 14 and has intersection points with the lateral grooves 13A and 15A along its path. Similarly, the shoulder main groove 12B connects two lateral grooves 14 and has intersection points with the lateral grooves 13B and 15B along its path.

In the present embodiment, the first shoulder block 40A, the first center block 20A, the second center block 30B, and the second shoulder block 50B are arranged in line sequentially from the ground contact end E1 side along the direction in which each lateral groove 14 extends. In addition, along the direction in which each lateral groove 14 extends, the second shoulder block 50A, the second center block 30A, the first center block 20B, and the first shoulder block 40B are arranged in line sequentially from the ground contact end E1 side. The tread pattern of the present embodiment can be described as a pattern in which two kinds of block groups, arranged in the direction in which each lateral groove 14 extends, are alternately arranged in the tire circumferential direction.

Each lateral groove 14 extends from the ground contact end E1 to the ground contact end E2 beyond the equator CL and divides block groups 16 arranged in the tire circumferential direction in the center region. Each lateral groove 14 divides the first shoulder block 40A and the second shoulder block 50A, and the first shoulder block 40B and the second shoulder block 50B, respectively, in the left and right shoulder regions. The lateral grooves 15A and 15B are each disposed between two lateral grooves 14 in the left or right shoulder region. Specifically, the lateral grooves 14 and 15A are alternately arranged in the tire circumferential direction in the shoulder region on the right side, and the lateral grooves 14 and 15B are alternately arranged in the tire circumferential direction in the shoulder region on the left side.

The lateral grooves 14, 15A, and 15B are formed wider than the center main groove 11, the shoulder main grooves 12A and 12B, and the lateral grooves 13A and 13B. Accordingly, stones are likely to become lodged in the lateral grooves 14, 15A, and 15B. Driving with stones caught in the lateral grooves 14, 15A, and 15B may significantly degrade traction performance. Thus, a stone ejector, that is a protrusion for suppressing stone retention, is provided at the bottom of each of the lateral grooves 14, 15A, and 15B, extending along the groove. Hereinafter, for convenience of description, the lateral groove 14 on the lower side on the sheet of FIG. 2 may also be referred to as "first lateral groove 14", and the lateral groove 14 on the upper side on the sheet may also be referred to as "second lateral groove 14".

Each lateral groove 14 is provided with a stone ejector 60A in the shoulder region on the right side and a stone ejector 60B in the shoulder region on the left side. In addition, each lateral groove 15A is provided with stone ejectors 70A and 80A, and each lateral groove 15B is provided with stone ejectors 70B and 80B. As a result of the function of each stone ejector, stones lodged in the groove are easily discharged, and degradation in traction performance due to stone retention can be effectively suppressed. As described later in detail, a recessed portion that is recessed with decrease in height is formed at an intermediate portion of each stone ejector in the length direction. Due to the effect of the recessed portion, stones lodged in the groove can be effectively discharged.

Each above-described stone ejector is an elongated protrusion that is extended long in the direction in which the corresponding groove extends, and formed straight without being bent along its path. The height of each stone ejector is lower than the heights of the shoulder blocks, and the upper surface of each stone ejector does not touch a flat road surface. The stone ejectors 70A and 80A are arranged in the direction in which each lateral groove 15A extends and spaced apart from each other so as not to interfere with each other. Similarly, the stone ejectors 70B and 80B are arranged in the direction in which each lateral groove 15B extends and spaced apart from each other so as not to interfere with each other.

The tread 10 further includes a stone ejector 17A that is a substantially triangular protrusion in a plan view at the intersection point of the shoulder main groove 12A and the second lateral groove 14, and also includes a stone ejector 17B that is a substantially triangular protrusion in a plan view at the intersection point of the shoulder main groove 12B and the first lateral groove 14. The shoulder main groove 12A is significantly curved toward the ground contact end E1 side along the protruding portion 24A of each first center block 20A in the vicinity of the intersection point with the second lateral groove 14. The shoulder main groove 12B is significantly curved toward the ground contact end E2 side along the protruding portion 24B of each first center block 20B in the vicinity of the intersection point with the first lateral groove 14.

As illustrated in FIG. 2, the irregular shape of each buttress region 4 can be observed in a plan view of the tread 10 as well. In the vicinity of the ground contact ends E1 and E2, the first shoulder blocks 40A and 40B are deeply recessed inward in the tire axial direction, whereas the second shoulder blocks 50A and 50B protrude outward in the tire axial direction. In the vicinity of the side ribs 5, the first shoulder blocks 40A and 40B further protrude outward in the tire axial direction than the second shoulder blocks 50A and 50B. As described above, due to the difference in protrusion shape among the sidewalls 43A, 43B, 53A, and 53B of the shoulder blocks, irregularities are formed in the buttress regions 4 in the tire circumferential direction.

The configurations of the first center blocks 20A, the second center blocks 30A, the first shoulder blocks 40A, and the second shoulder blocks 50A will be described below in further detail.

First Center Block 20A

Each first center block 20A includes a slit 21A that extends from the shoulder main groove 12A and terminates in the block, and the protruding portion 24A that protrudes from a portion adjacent to the slit 21A. The slit 21A, which is also referred to as a notch in the tire industry, is formed with a mold in the same manner as main grooves and lateral grooves. The protruding portion 24A is a portion protruding toward outside of the block beyond a block end on the opposite side of the slit 21A. The first center block 20A is also formed with one sipe 22A.

In the present specification, a slit is defined to be a groove that terminates in a block having a width of 1.5 mm or larger, and a sipe is defined to be a narrow groove having a width smaller than 1.5 mm. The maximum width of a slit is preferably 2.0 mm to 4.0 mm inclusive. The maximum width of a sipe is preferably 0.3 mm to 1.0 mm inclusive.

Each first center block 20A is disposed facing each corresponding second center block 30B in the tire axial direction with the center main groove 11 in between, and the center main groove 11 includes the bent portion 11$x$ in a region sandwiched between the two blocks. When viewed from the first lateral groove 14 side, the center main groove 11 is significantly curved toward the equator CL side at the bent portion 11$x$. Accordingly, at a block end of the first center block 20A along the center main groove 11, a portion close to the equator CL protrudes farther toward the equator CL side than a portion close to the first lateral groove 14. Note that a portion of the center main groove 11 from the first lateral groove 14 to the bent portion 11$x$, and a portion thereof from the bent portion 11$x$ to the equator CL, are substantially parallel to each other.

Each first center block 20A is disposed facing each corresponding second center block 30A in the tire circumferential direction with the corresponding lateral groove 13A in between, and the lateral groove 13A includes the bent portion 13Ax at a region sandwiched between the two blocks. When viewed from the center main groove 11 side, the lateral groove 13A is significantly curved toward the second center block 30A side at the bent portion 13Ax. Accordingly, at a block end of the first center block 20A along the lateral groove 13A, a portion close to the shoulder main groove 12A protrudes farther toward the second center block 30A side than a portion close to the center main groove 11. Note that a portion of the lateral groove 13A from the center main groove 11 to the bent portion 13Ax, and a portion thereof the bent portion 13Ax to the shoulder main groove 12A, are parallel to each other.

Each first center block 20A, which has a shape with a locally protruding block end as described above, can have a larger number of engagements with mud, rocks, and the like, thereby contributing to improvement of traction performance during off-road driving. In particular, the protruding portion 24A protrudes significantly toward the ground contact end E1 side, thereby significantly contributing to improvement of traction performance. However, when the protruding portion 24A is provided, the block rigidity is locally reduced at the protruding portion 24A and the block is more susceptible to uneven wear. As described later in detail, to suppress such uneven wear, the shoulder main groove 12A is formed with a groove bottom protrusion 28A in which the groove bottom is raised from a portion adjacent to an opening portion 21Ed (refer to FIG. 7 or the like to be described later) of the slit 21A so as to connect to the protruding portion 24A.

Each first center block 20B includes a slit 21B, a sipe 22B, and the protruding portion 24B, and contributes to improvement of traction performance during off-road driving together with the first center blocks 20A. The protruding portion 24B protrudes significantly toward the ground contact end E2 side, and the shoulder main groove 12B is formed with a groove bottom protrusion 28B in which the groove bottom is raised from a portion adjacent to an opening portion of the slit 21B so as to connect to the protruding portion 24B. Note that the orientation of each first center block 20B differs by 180° from that of each first center block 20A, but the blocks have the same shape as each other, and thus common features of the two blocks will be described with the first center block 20A as an example.

Second Center Block 30A

Each second center block 30A includes a slit 31A that extends from the corresponding lateral groove 13A and terminates in the block. The slit 31A is formed from the shoulder main groove 12A side of the bent portion 13Ax of the lateral groove 13A to a central portion of the second center block 30A. The slit 31A is more significantly tilted in the tire circumferential direction than the center main groove 11 and the shoulder main grooves 12A and 12B, thereby increasing a block end that engages with mud, rocks, and the like. The second center block 30A is also formed with one sipe 32A.

Each second center block 30A is disposed facing the corresponding first center block 20B in the tire axial direction with the center main groove 11 in between, and the center main groove 11 includes a bent portion 11_y_ in a region sandwiched between the two blocks. When viewed from the equator CL side, the center main groove 11 is significantly curved toward the ground contact end E2 side at the bent portion 11_y_. Accordingly, at a block end of the second center block 30A along the center main groove 11, a portion apart from the equator CL (in other words, a portion close to the second lateral groove 14) protrudes on the ground contact end E2 side of a portion close to the equator CL. Note that a portion of the center main groove 11 from the equator CL to the bent portion 11_y_, and a portion thereof from the bent portion 11_y_ to the second lateral groove 14, are substantially parallel to each other.

Each second center block 30A is disposed facing the second center block 30B of another block group 16 in the tire circumferential direction with the corresponding lateral groove 14 in between. In other words, the second center block 30A of a first block group 16 and the second center block 30A of a second block group 16 are arranged in the tire circumferential direction with the corresponding lateral groove 14 in between. The lateral groove 14 includes a bent portion 14_x_ and is bent between the second center blocks 30A and 30B. The bent portion 14_x_ is positioned on the equator CL and significantly curved toward the second center block 30B side when viewed from the ground contact end E2 side. Accordingly, a block end of the second center block 30A, which is positioned on the ground contact end E1 side of the bent portion 14_x_, protrudes on the second center block 30B side.

Each second center block 30B includes a slit 31B and a sipe 32B and contributes to improvement of traction performance during off-road driving together with the other center blocks. Note that the orientation of each second center block 30B differs by 180° from that of each second center block 30A, but the blocks have the same shape as each other, and thus common features of the two blocks will be described with the second center block 30A as an example.

First Shoulder Block 40A

Each first shoulder block 40A is a block that is surrounded on three sides by the shoulder main groove 12A, the first lateral groove 14, and the corresponding lateral groove 15A, and is longer in the tire axial direction than in the tire circumferential direction. A block end thereof along the shoulder main groove 12A is tilted, for example, at the angle of 10° to 20° relative to the tire axial direction such that the block end is positioned closer to the equator CL as it approaches the lateral groove 15A. Block ends thereof along the lateral grooves 14 and 15A extend in the tire axial direction from the ground contact end E side and then bend toward the same side in the tire circumferential direction. The tilt angles of the bent block ends relative to the tire axial direction are, for example, 15° to 25°.

As described above, each first shoulder block 40A has a shape in which a portion positioned on the shoulder main groove 12A side is bent toward the second shoulder block 50A divided therefrom by the corresponding lateral groove 15A. The first shoulder block 40A has a protruding corner formed with an acute angle at the intersection point of the shoulder main groove 12A and the lateral groove 15A. As described later in detail, the corner of the first shoulder block 40A is formed in a stepped shape with three or more steps, and the second step from the block contact area side has a tilted surface 45A having a triangular or trapezoidal shape in a plan view, the size of which gradually decreases toward the groove bottom. The stepped shape effectively suppresses uneven wear of the first shoulder block 40A.

Each first shoulder block 40A is formed with one sipe 41A extending in the tire axial direction. The sipe 41A improves ground contact performance of the first shoulder block 40A and contributes to, for example, improvement of driving stability, cornering characteristics, and the like. From the perspective of durability improvement and the like of the first shoulder block 40A, the sipe 41A is preferably formed at a position separated from the end of the block contact area by a predetermined length (the same for a sipe 51A to be described later). The sipe 41A is formed at a central portion of the first shoulder block 40A in the tire circumferential direction and is bent on the lateral groove 15A side along its path in the same manner as the block shape.

As described above, the outer portion of the sidewall 43A of each first shoulder block 40A in the tire radial direction is more deeply recessed inward in the axial direction than the second sidewall 53A of each second shoulder block 50A. Accordingly, the ground contact end (contact area end on the outer side in the tire axial direction) of the first shoulder block 40A is positioned inward of the ground contact end E1 in the tire axial direction. The ground contact end of the first shoulder block 40A is positioned inward of the ground contact end E1 in the tire axial direction by, for example, approximately 1.0 mm to 6.0 mm. Moreover, the area of the contact area of the first shoulder block 40A is smaller than the area of the contact area of the second shoulder block 50A and is, for example, 80% to 90% of the area of the contact area of the second shoulder block 50A.

Each first shoulder block 40B includes a sipe 41B, and a tilted surface 45B formed at a corner of the block. Note that the orientation of each first shoulder block 40B differs by 180° from that of each first shoulder block 40A, but the blocks have the same shape as each other, and thus common features of the two blocks will be described with the first shoulder block 40A as an example.

Second Shoulder Block 50A

Each second shoulder block 50A is a block that is surrounded on three sides by the shoulder main groove 12A, the second lateral groove 14, and the corresponding lateral groove 15A and is longer in the tire axial direction than in the tire circumferential direction. The second shoulder block 50A has a narrowing shape with a length in the tire circumferential direction gradually decreasing toward the equator CL side. Block ends thereof along the lateral grooves 14 and 15A extend in the tire axial direction from the ground contact end E side to a predetermined position and bend in the direction in which the block ends approach each other at the predetermined position. The predetermined position is positioned on the equator CL side of a position where each first shoulder block 40A bends.

Each second shoulder block 50A is formed with one sipe 51A extending in the tire axial direction. The sipe 51A improves ground contact performance of the second shoulder block 50A and contributes to, for example, improvement of driving stability, cornering characteristics, and the like. The sipe 51A is formed at a central portion of the second shoulder block 50A in the tire circumferential direction and is bent on the lateral groove 15A side along its path. The outer portion of the sidewall 53B of each second shoulder block 50A in the tire radial direction is positioned outward of the sidewall 43A of each first shoulder block 40A in the tire axial direction, and the ground contact end of the second shoulder block 50A serves as the ground contact end E1 of the tread 10.

Each second shoulder block 50B is formed with a sipe 51B. Note that the orientation of each second shoulder block 50B differs by 180° from that of each second shoulder block 50A, but the blocks have the same shape as each other, and thus common features of the two blocks will be described with the second shoulder block 50A as an example.

Supplementary description will be given below on the lateral grooves 14 and 15A. Both end portions of each lateral groove 14 in the tread 10 in the length direction, specifically, a portion from the ground contact end E1 to the intersection point with the shoulder main groove 12A, and a portion from the ground contact end E2 to the intersection point with the shoulder main groove 12B, extend in the tire axial direction. An intermediate portion connecting both end portions of each lateral groove 14 in the length direction is tilted relative to the tire axial direction and includes the bent portion 14*x* at the intersection point with the equator CL. The intermediate portion of each lateral groove 14 is connected to the center main groove 11 and the shoulder main grooves 12A and 12B, and accordingly, one lateral groove 14 is connected to a total of five tire circumferential grooves.

Similarly to each lateral groove 14, a portion of each lateral groove 15A in the vicinity of the ground contact end E1 extends in the tire axial direction, bends in the tire circumferential direction at an intermediate portion, and tilts relative to the tire axial direction. The lateral groove 15A bends in a direction in which the lateral groove 15A intersects the lateral groove 14. The tilt angle of the lateral groove 15A relative to the tire axial direction is, for example, 15° to 25°.

Figure 4:
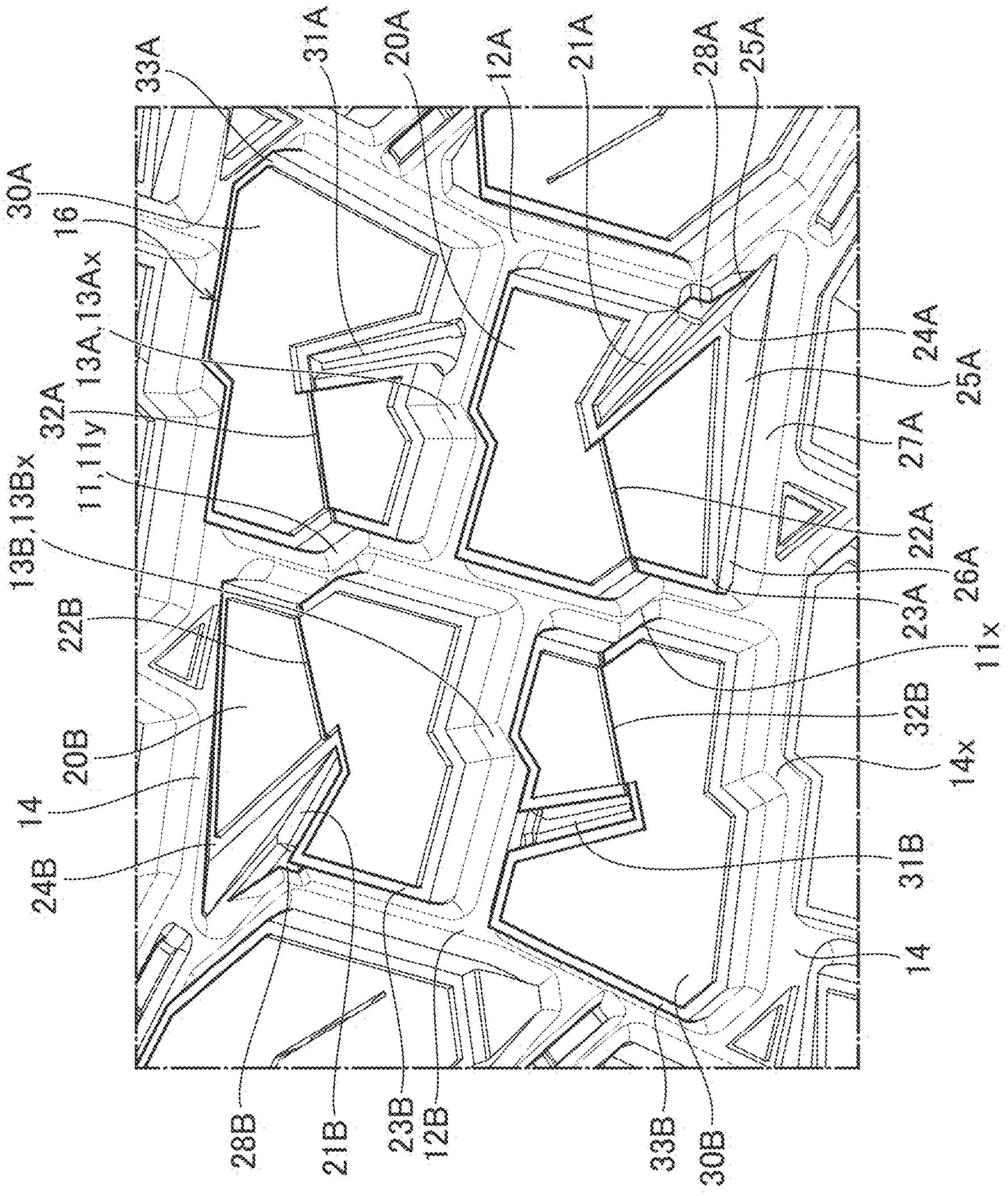
FIG. 4 is a perspective view of a center region of the tread.
Figure 5:
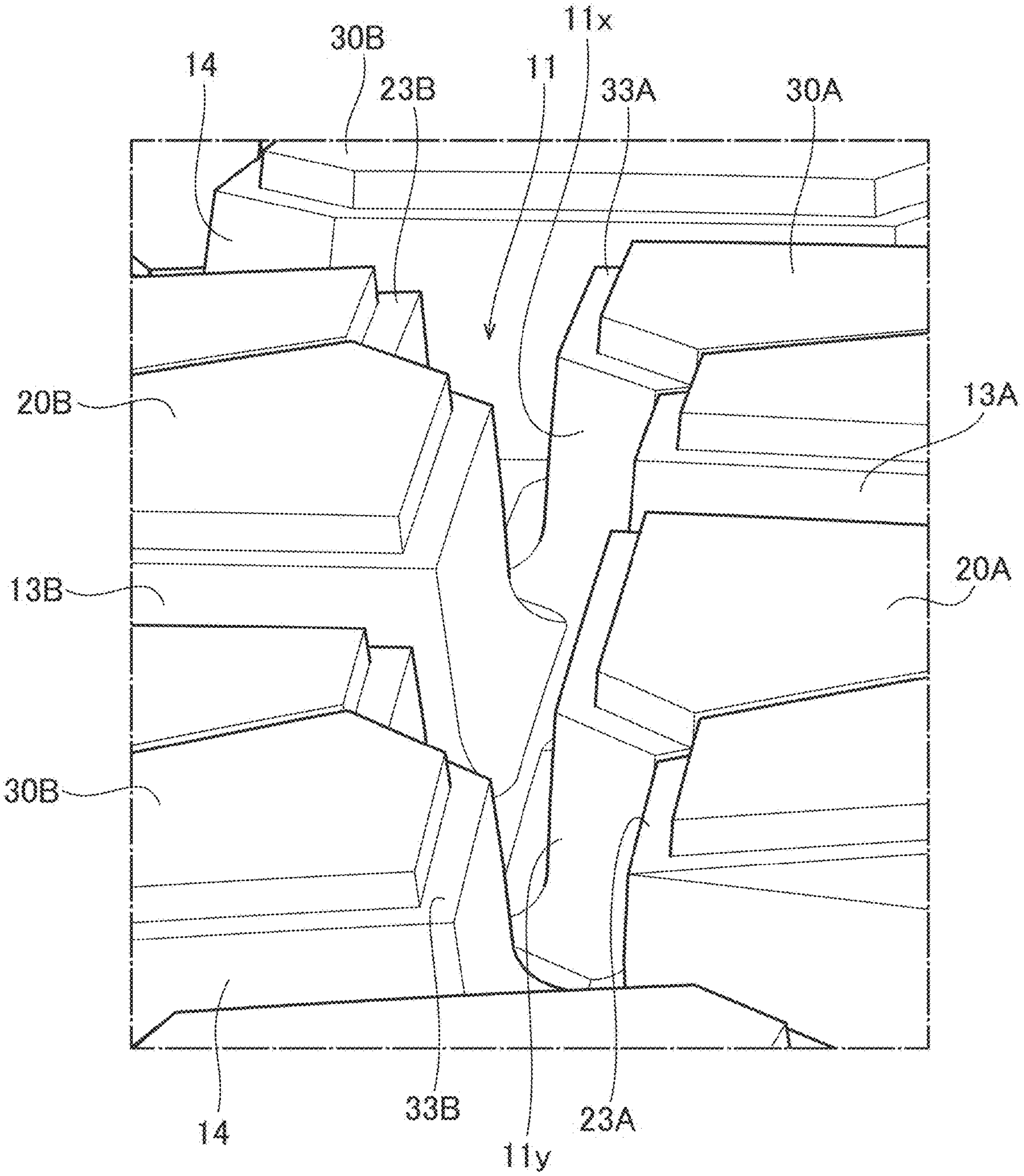
FIG. 5 is a perspective view of a center main groove of the tread and its vicinity.
Figure 6B:
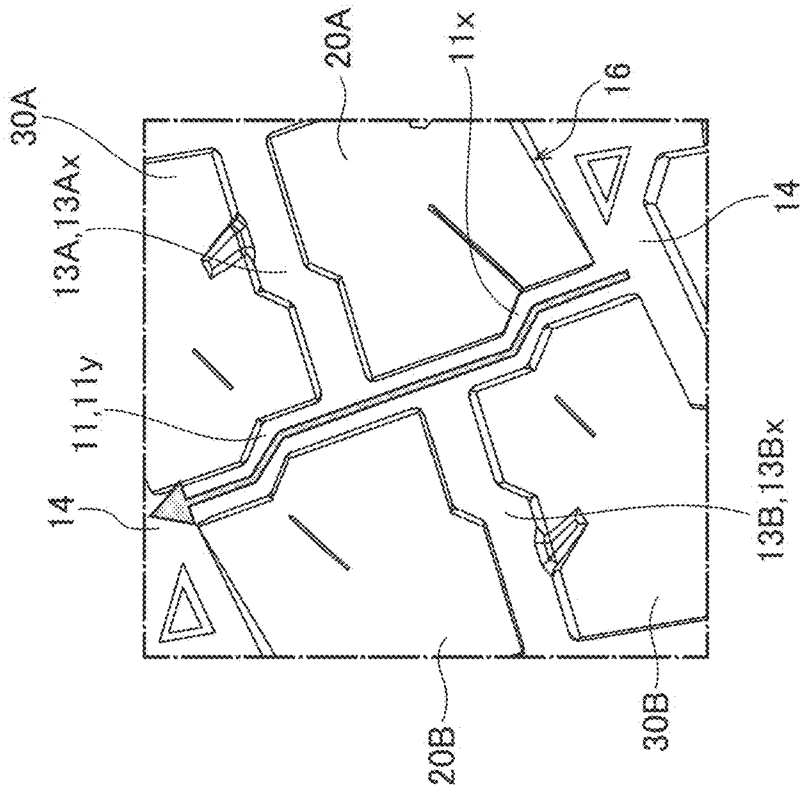
FIGS. 6A and 6B are diagrams for description of air flow along the center main groove.
Figure 6A:
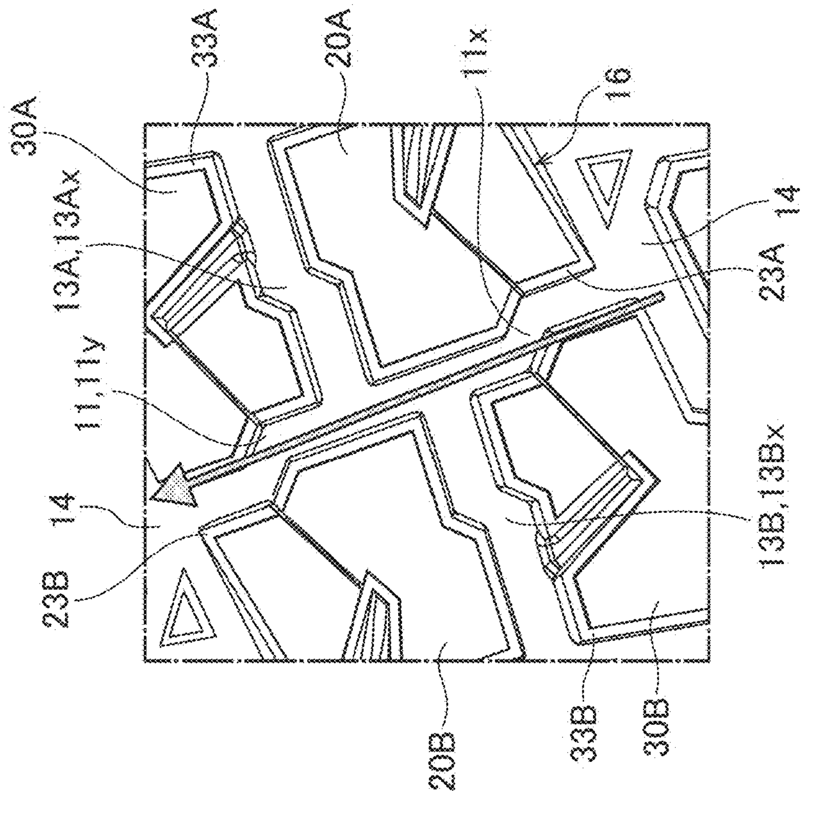

The following describes the configuration of each block group 16, particularly the configuration of the center main groove 11 longitudinally traversing the block group 16, in further detail with reference to FIGS. 4 to 6. FIG. 4 is a perspective view of the center region of the tread 10, and FIG. 5 is a perspective view of the center main groove 11 and its vicinity. FIGS. 6A and 6B are diagrams for description of air flow along the center main groove 11.

As illustrated in FIGS. 4 and 5, the four center blocks constituting the block group 16 each include a stepped portion along the periphery of the block upper surface, where the height of the upper surface is one step lower. By forming the stepped portion, it is possible to disperse ground contact pressure acting on a block end, thereby making the ground contact pressure more uniform. The first center blocks 20A and 20B are each formed with a stepped portion 23A or 23B so as to surround the periphery of the block upper surface including the edge of the slit 21A or 21B. Similarly, the second center blocks 30A and 30B are each formed with a stepped portion 33A or 33B so as to surround the periphery of the block upper surface including the edge of the slit 31A or 31B. Note that each stepped portion can be said to be formed along a groove to increase the groove width in the vicinity of the groove opening portion in effect.

The stepped portion 23A of the first center block 20A is formed with substantially constant width and depth along the periphery of the block upper surface. The width of the stepped portion 23A is, for example, 1.0 mm to 3.0 mm. The depth of the stepped portion 23A is, for example, 1.0 mm to 3.0 mm from the contact area of the first center block 20A and may be substantially equal to the width of the stepped portion 23A. The depth of the stepped portion 23A is preferably 5% to 20% of the depth of the center main groove 11 and more preferably 10% to 15% thereof. The stepped portion 33A of the second center block 30A preferably has a width and a depth substantially equal to those of the stepped portion 23A of the first center block 20A.

The first center block 20A includes the sipe 22A that extends from the center main groove 11 and terminates in the block. The sipe 22A improves ground contact performance of the first center block 20A and contributes to, for example, improvement of braking performance, driving stability, and the like. The sipe 22A is formed straight from a portion that is a block end positioned at the bent portion 11*x* of the center main groove 11 and recessed inside the block to the stepped portion 23A along the edge of the slit 21A. The sipe 22A may communicate with the slit 21A. To suppress reduction in the block rigidity, the sipe 22A is preferably deep at a central portion in the length direction and shallow at both end portions in the length direction. Note that the first center block 20A is formed with no grooves other than the slit 21A and the sipe 22A.

The second center block 30A includes the sipe 32A that extends from the center main groove 11 and terminates in the block. The sipe 32A improves ground contact performance of the second center block 30A and contributes to, for example, improvement of braking performance, driving stability, and the like. The sipe 32A is formed straight from a portion that is a block end positioned at the bent portion 11*y* of the center main groove 11 and recessed inside the block to the slit 31A. Similarly to the sipe 22A, the sipe 32A is preferably deep at a central portion in the length direction and shallow at both end portions in the length direction. Note that the second center block 30B is formed with no grooves other than the slit 31A and the sipe 32A.

The depth of the center main groove 11 is, for example, 13.5 mm to 16.5 mm and substantially constant across the entire length. In the present embodiment, the depths of the center main groove 11, the shoulder main grooves 12A and 12B, and the lateral grooves 13A and 13B are substantially equal. In this case, stable drainage performance and mud discharge performance are exhibited in the center region of the tread 10. The depths of all main and lateral grooves including the lateral grooves 14, 15A, and 15B may be substantially equal. The depth of a groove means the shortest distance from a profile surface P of the tread 10 to the deepest portion of the groove (length along the normal to the profile surface P), and the profile surface P of the tread 10 means a surface along the contact area of the tread 10.

The width of the center main groove 11 is, for example, 7.0 mm to 17.0 mm and is substantially constant across the entire length. The widths of the lateral grooves 13A and 13B may be equal to the width of the center main groove 11, but in the present embodiment, are slightly larger than the center main groove 11. The widths of the lateral grooves 13A and 13B are, for example, 1.05 to 1.20 times larger than the width of the center main groove 11 and are substantially constant across the entire length. In the present specification, the width of a groove means the groove width along the profile surface P, in other words, the groove width at the groove opening portion. The groove opening portion means the position of the groove on the profile surface P. Note that the width of a stepped portion is not included in the groove width.

As described above, the center main groove 11 includes the bent portions 11*x* and 11*y* that are bent in the tire axial direction. The bent portion 11*x* is positioned between the first center block 20A and the second center block 30B, and the bent portion 11*y* is positioned between the first center block 20B and the second center block 30A. With the bent portions 11*x* and 11*y*, irregularities in the tire axial direction are formed at block ends of the four center blocks along the center main groove 11, which increases the number of engagements with mud, rocks, and the like, thereby improving traction performance.

The center main groove 11 is formed straight between the bent portions 11*x* and 11*y* and includes intersection points with the two lateral grooves 13A and 13B. Specifically, an intermediate portion of the center main groove 11 positioned between the bent portions 11*x* and 11*y* is formed straight, and the lateral grooves 13A and 13B branch from the intermediate portion. Although bending the center main groove 11 may raise concerns about degradation of drainage performance, the straight shape of the intermediate portion where the lateral grooves 13A and 13B are connected effectively improves drainage performance on a wet road surface. The intermediate portion of the center main groove 11 crosses the equator CL, and the center of the intermediate portion in the length direction is positioned on the equator CL. Accordingly, stable drainage performance is exhibited in the vicinity of the equator CL.

In the present embodiment, the first center block 20A overlaps the other three center blocks constituting the block group 16 in the tire axial direction. Specifically, the four center blocks constituting the block group 16 are disposed in a staggered shape in the tire circumferential direction so as to overlap one another in the tire axial direction. Moreover, the second center block 30A of the first block group 16 and the second center block 30B of the second block group 16 overlap each other in the tire axial direction. Although such disposition of the center blocks contributes to improvement of traction performance, but is disadvantageous in terms of drainage performance, favorable drainage performance can be ensured by the effects of the above-described intermediate portion and straight region of the center main groove 11 and the like.

The center main groove 11 longitudinally traverses the block groups 16 but is divided between the block groups 16. The center main grooves 11 communicate in the tire circumferential direction with the lateral grooves 14 interposed, but cannot be said to be continuous in the tire circumferential direction. In other words, a plurality of center main grooves 11 are arranged in the tire circumferential direction in the center region of the tread 10. Each center main groove 11 is tilted relative to the tire circumferential direction and thus abuts the center blocks of other block groups 16. The second center blocks 30A and 30B are disposed on an extended line of the center main groove 11. Such a configuration of the center main groove 11 is also disadvantageous in terms of drainage performance, but as described above, favorable drainage performance can be ensured by the effects of the intermediate portion and straight region of the center main groove 11 and the like.

Each center main groove 11 is bent in the same direction at the bent portions 11*x* and 11*y*. The degree of groove bending is substantially the same at the bent portions 11*x* and 11*y*. The intermediate portion positioned between the bent portions 11*x* and 11*y*, a portion (hereinafter referred to as "first end portion") positioned between the first lateral groove 14 and the bent portion 11*x*, and a portion (hereinafter referred to as a "second end portion") positioned between the second lateral groove 14 and the bent portion 11*y*, are parallel to one another. The first and second end portions have, for example, lengths equal to each other and shorter than the length of the intermediate portion. The length of the intermediate portion is, for example, 1.5 to 3.0 times longer than the length of each end portion.

As described above, each center main groove 11 includes the straight region extending straight across the entire length. In the present specification, the straight region of each center main groove 11 is defined to be a region where a second intersection point with the second lateral groove 14 can be visually recognized when the center main groove 11 is viewed in the tire circumferential direction from a first intersection point with the first lateral groove 14. The straight region is present on the groove opening portion side but not on the groove bottom side. In other words, the center main groove 11 is formed so as to include the straight region on the groove opening portion side but not on the groove bottom side, with an adjusted bending degree of the center main groove 11 at the bent portions 11*x* and 11*y*.

The sidewall of each block forming the groove wall of the center main groove 11 is gradually tilted such that the groove width gradually decreases toward the groove bottom and curved in the vicinity of the groove bottom (the same applies for sidewalls along the lateral grooves 13A, 13B, and 14). The tilt angle of the sidewall of each center block is, for example, 3° to 8° or 4° to 7°. The curvature radius of the curved surface is, for example, 1.5 mm to 4.5 mm. Accordingly, when the center main groove 11 is bent, the groove walls more significantly overlap one another on the groove bottom side than on the groove opening portion side, which eliminates the straight region. Note that the tilt angle of the sidewall of a block means a tilt angle relative to a normal to the profile surface P passing through the upper end of the sidewall (refer to FIG. 11 to be described later, for example).

The ratio of the cross-sectional area of the straight region to the cross-sectional area of the center main groove 11 in the width direction is preferably 20% to 80% and more preferably 30% to 70%. The cross-sectional area of the straight region means the area of the straight region when the center main groove 11 is viewed from the first lateral groove 14 side, in other words, the area of the second lateral groove 14 that can be visually recognized from the first lateral groove 14 side through the center main groove 11. The straight region is preferably present only in a region that is shallower than 85% of the depth of the center main groove 11 from the profile surface P, and is more preferably present only in a region that is shallower than 75%. In other words, the straight region is not preferably present in the region of 15% or 25% of the center main groove 11 on the groove bottom side.

In the present embodiment, since the stepped portions 23A, 23B, 33A, and 33B are formed along the center main groove 11, a larger straight region is formed on the groove opening portion side than in a case where no stepped portions are present. Note that although the widths of the stepped portions are not included in the groove width, the cross-sectional areas of the stepped portions in the width direction are counted as part of the cross-sectional area of the straight region. Due to the presence of the stepped portions, for example, the cross-sectional area of the straight region is large in a region that is shallower than 15% of the depth of the center main groove 11 from the profile surface P, but decreases steeply beyond the positions of the stepped portions. Providing the large straight region on the groove opening portion side improves drainage performance on a wet road surface.

The straight intermediate portion of the center main groove 11 is formed at the center of the four center blocks of the block group 16, and the lateral grooves 13A and 13B extend from the intermediate portion. In the present embodiment, the bent portions 11*x*, 11*y*, 13Ax, and 13Ay are formed in respective grooves extending from the center of the four center blocks and connecting the shoulder main grooves 12A and 12B and two lateral grooves 14 formed around the block group 16. In addition, the bent portions 14*x* are formed in the lateral grooves 14. Forming the center main groove 11 and the lateral grooves 13A, 13B, and 14 in zigzag shapes at the center region of the tread 10 significantly improves traction performance during off-road driving.

FIGS. 6A and 6B are diagrams for description of air flow along the center main groove 11. FIG. 6A illustrates air flow at the tire surface (profile surface P) of the tread 10, and FIG. 6B illustrates air flow at the position of 75% of the depth of the center main groove 11 from the profile surface P. As illustrated in FIG. 6A, the center main groove 11 includes the straight region on the tire surface side, and part of air flowing along the center main groove 11 flows straight from the first lateral groove 14 to the second lateral groove 14. On the other hand, as illustrated in FIG. 6B, the straight region is not present on the groove bottom side at the center main groove 11, and air does not flow straight.

Since air flow along the center main groove 11 is significantly different between the tire surface side and the groove bottom side, as described above, the flow speed is faster on the tire surface side and slower on the groove bottom side. As a result, airflow is disturbed and resonance between air columns is reduced. Thus, since the route and flow speed of air flow differ in the depth direction of the center main groove 11, bent air flow on the groove bottom side affects air flow on the tire surface side, which effectively suppresses noise due to resonance between air columns. The center main groove 11, which is bent such that the straight region is present on the tire surface side but not on the groove bottom side, contributes significantly to improvement of traction performance, quietness, and drainage performance, together with the lateral grooves 13A, 13B, and 14 and the like.

Figure 7:
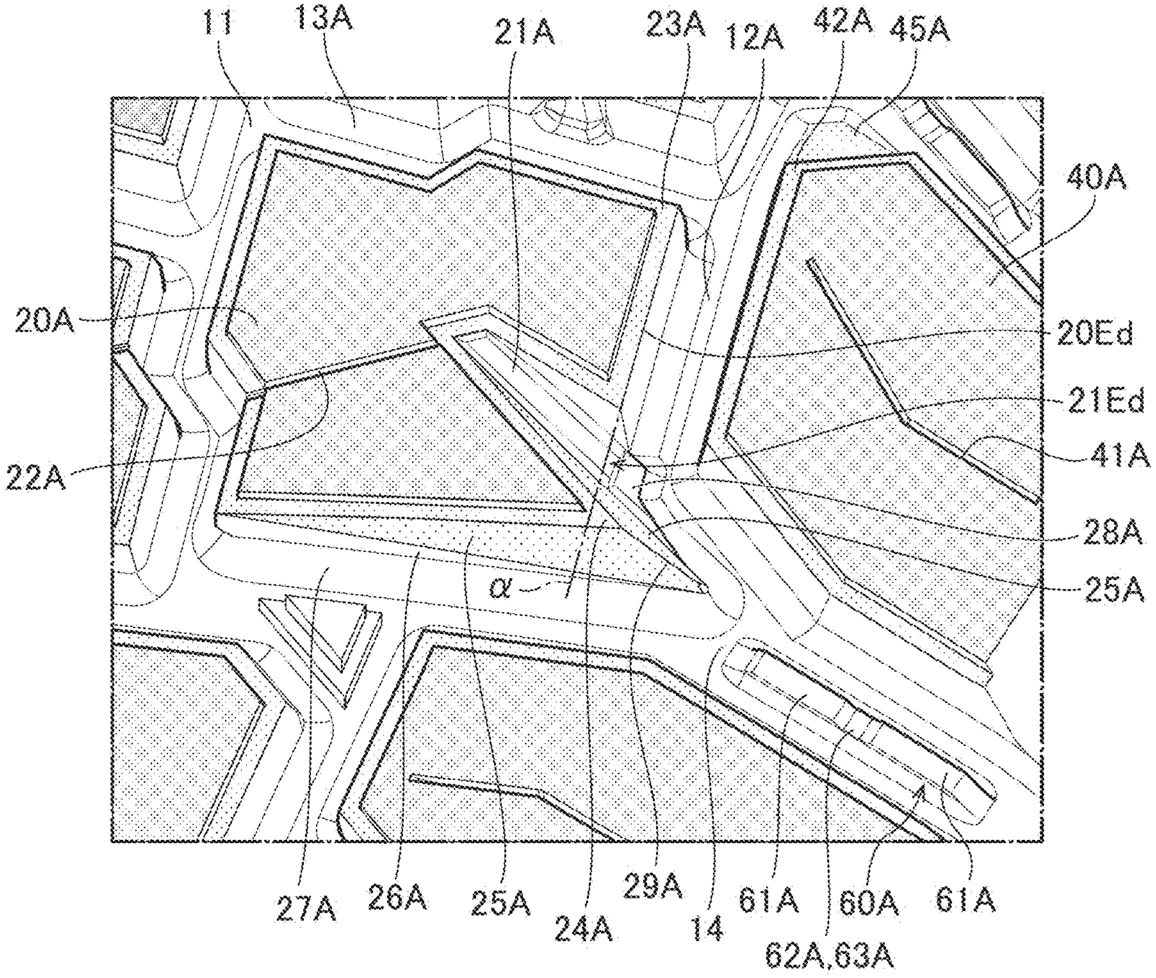
FIG. 7 is a perspective view illustrating part of the center region of the tread and part of a shoulder region.
Figure 8:
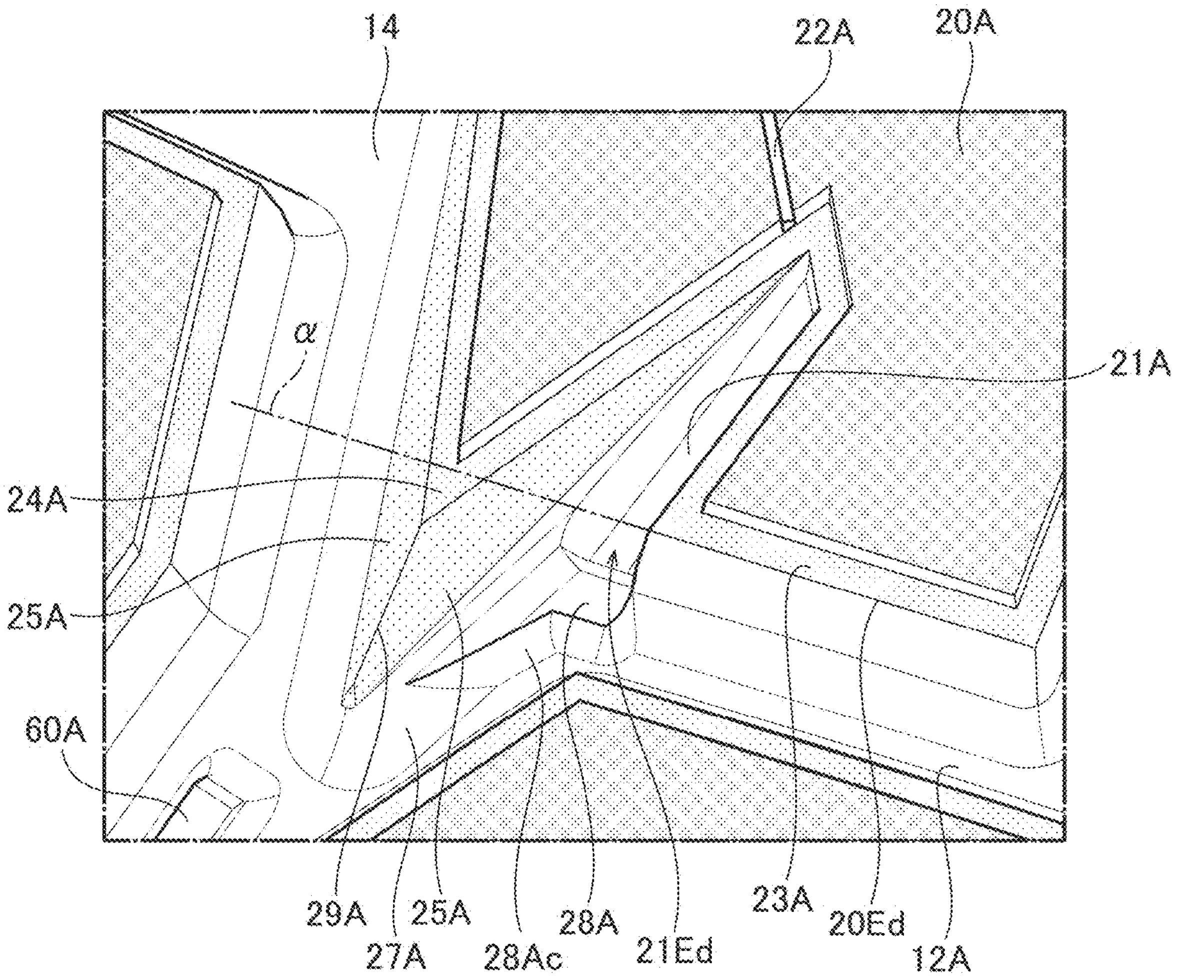
FIG. 8 is a perspective view of a protruding portion of a center block, and its vicinity.
Figure 9:
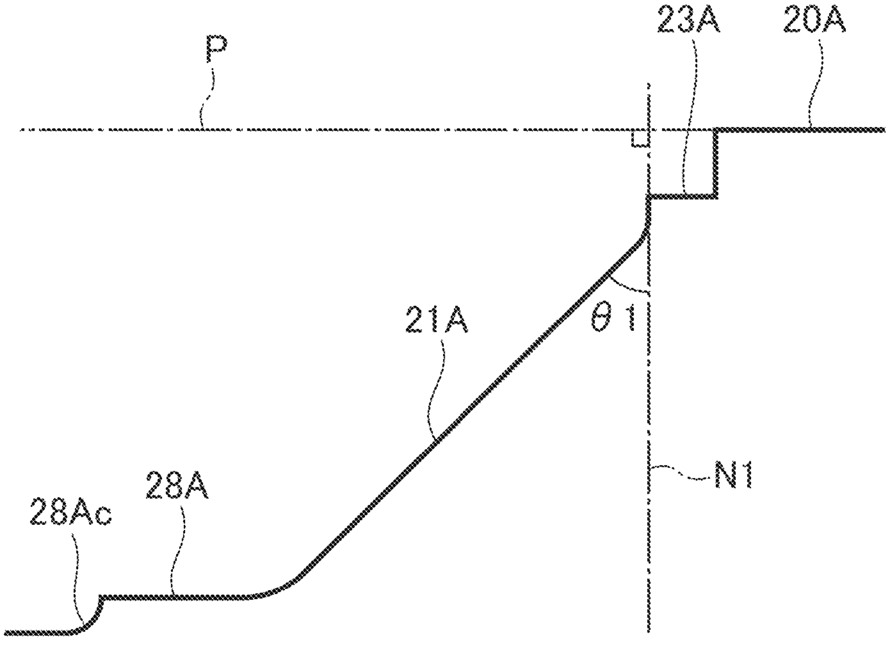
FIG. 9 is a cross-sectional view along line AA in FIG. 3.
Figure 10:
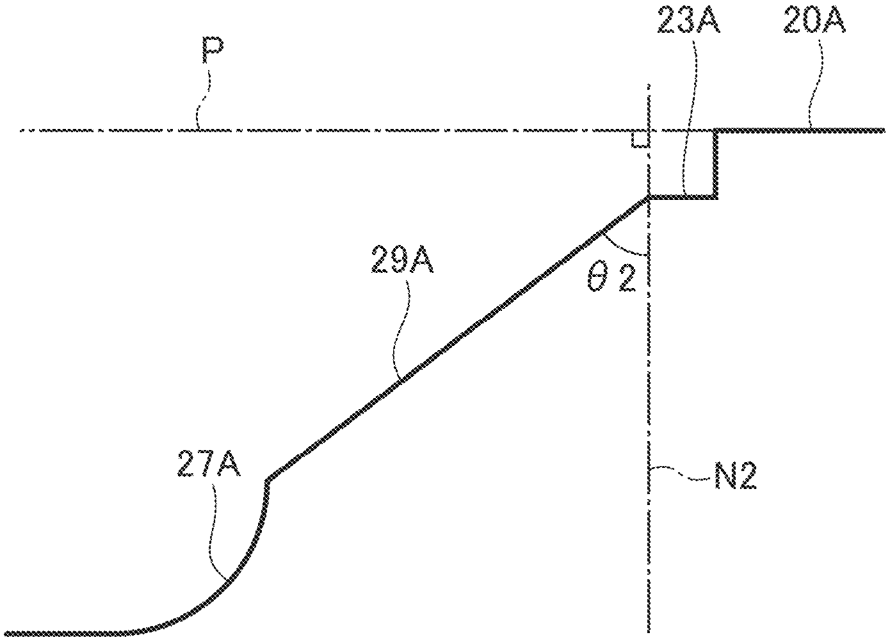
FIG. 10 is a cross-sectional view along line BB in FIG. 3.
Figure 11:
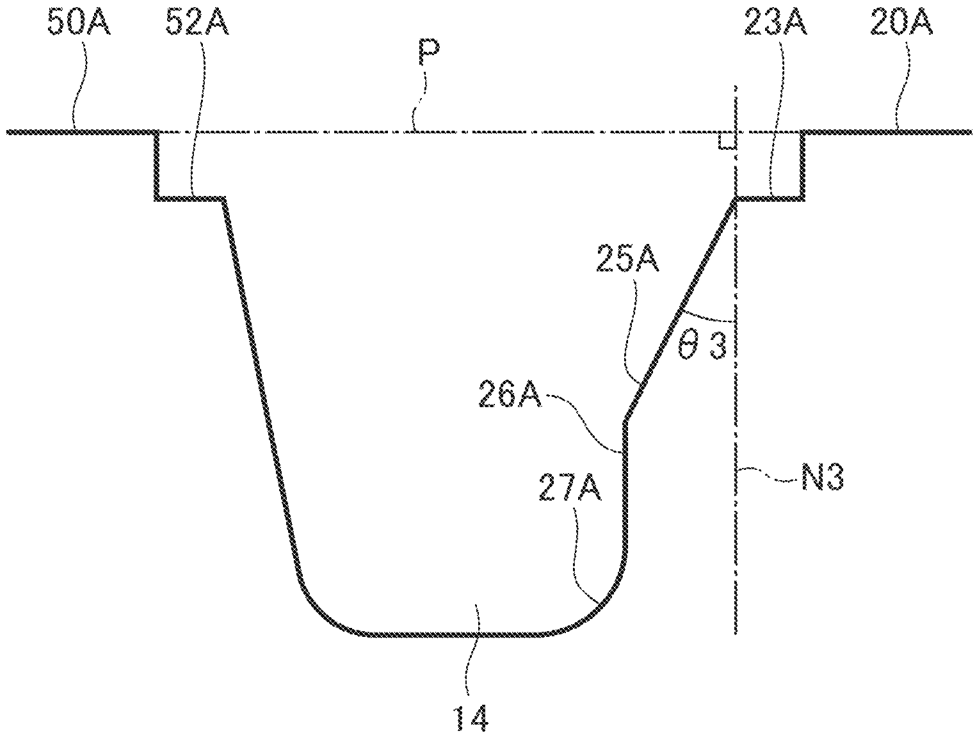
FIG. 11 is a cross-sectional view along line CC in FIG. 3.
Figure 12:
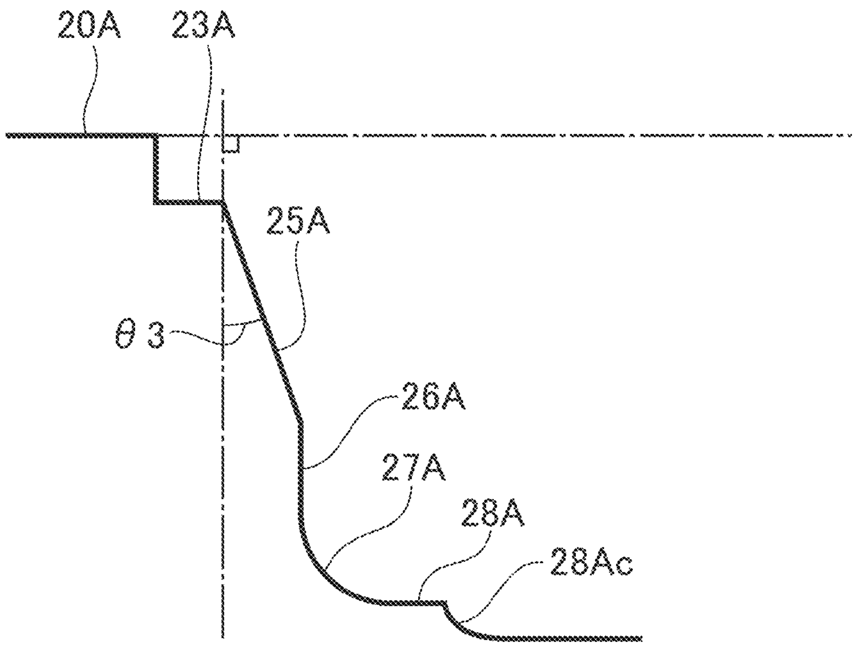
FIG. 12 is a cross-sectional view along line DD in FIG. 3.

The groove bottom protrusion 28A connecting the slit 21A, the protruding portion 24A, and the protruding portion 24A of each first center block 20A will be described below in further detail with reference to FIGS. 7 to 12. FIG. 7 is a perspective view of the first center block 20A, the stone ejector 60A, and its vicinity, and FIG. 8 is a perspective view of the protruding portion 24A of the first center block 20A and its vicinity. FIG. 9 is a cross-sectional view along line AA in FIG. 3, FIG. 10 is a cross-sectional view along line BB in FIG. 3, FIG. 11 is a cross-sectional view along line CC in FIG. 3, and FIG. 12 is a cross-sectional view along line DD in FIG. 3, and those diagrams will be referred to as appropriate.

As illustrated in FIGS. 7 and 8, the first center block 20A includes the protruding portion 24A that protrudes outward in the tire axial direction from a portion adjacent to the slit 21A, and has a narrowing shape with a width gradually decreasing toward the distal end. The protruding portion 24A is a portion protruding toward the outside of the block beyond a block end 20Ed on the opposite side of the slit 21A. The protruding portion 24A protrudes farther toward the outer side in the tire axial direction than a virtual line $\alpha$ as an extension of the block end 20Ed and is formed in a triangular shape in a plan view. Providing the slit 21A and the protruding portion 24A protruding in the direction in which the slit 21A extends increases the number of block engagements with mud, rocks, and the like, thereby significantly improving traction performance on muddy road, rocky terrain, sandy surfaces, and the like.

The slit 21A extends straight to a terminal end inside the block without bending along its path, but the slit width gradually decreases toward the terminal end. The slit width at the opening portion 21Ed of the slit 21A is, for example, 6.0 mm to 13.0 mm, which is two to three times larger than the slit width at the terminal end. The opening portion 21Ed of the slit 21A means an opening portion for the shoulder main groove 12A and is positioned on the above-described virtual line $\alpha$. The length of the slit 21A is, for example, 15.0 mm to 30.0 mm.

The depth of the slit 21A preferably gradually decreases from the opening portion 21Ed side toward the terminal end side. As illustrated in FIG. 9 (cross-sectional view in the length direction of the slit 21A), the bottom surface of the slit 21A is tilted at an angle that is substantially constant in the length direction of the slit 21A. A tilt angle $\theta 1$ of the bottom surface of the slit 21A relative to a normal N1 is, for example, 60° to 70°, which is larger than the tilt angle of a ridge 29A of the protruding portion 24A to be described later. The normal N1 is a normal to the profile surface P passing through the terminal end of the slit 21A. Note that the tilt angle $\theta 1$ is the angle between the normal N1 and the bottom surface of the slit 21A inside the block (the same applies for the tilt angle of any other tilted surface).

The slit 21A is deepest at the opening portion 21Ed. The depth of the slit 21A at the opening portion 21Ed is, for example, 85% to 95% of the depth of the shoulder main groove 12A. The slit 21A is shallowest at the terminal end inside the block. The depth of the slit 21A at the terminal end is, for example, 1.5 to 3.0 times larger than the depth of the stepped portion 23A. The bottom surface of the slit 21A is tilted at the angle of 60° to 70° relative to the normal N1 from the opening portion 21Ed to the terminal end in the length direction of the slit 21A. In this case, it is possible to ensure favorable drainage performance and mud discharge performance while suppressing reduction in the block rigidity of the portion adjacent to the slit 21A. As described later in detail, the bottom surface of the slit 21A at the opening portion 21Ed and the upper surface of the groove bottom protrusion 28A have the same height, and the bottom surface of the slit 21A and the upper surface of the groove bottom protrusion 28A are smoothly connected.

The protruding portion 24A protrudes outward in the tire axial direction such that the protruding portion 24A enters between the corresponding first and second shoulder blocks 40A and 50A. The portion adjacent to the slit 21A and the protruding portion 24A is a block end formed at an acute angle with a narrowing distal end in a plan view, forming a corner of the first center block 20A positioned at the intersection point of the shoulder main groove 12A and the corresponding lateral groove 14. One of sidewalls of the protruding portion 24A faces the shoulder main groove 12A. The shoulder main groove 12A is bent at the base of the protruding portion 24A and includes the groove bottom protrusion 28A at the bent portion.

The length of the protruding portion 24A in the tire axial direction (maximum length in the tire axial direction from the virtual line α to the distal end of the protruding portion 24A) is, for example, 11.0 mm to 23.0 mm, which is 70% to 120% of the length of the slit 21A. In this case, it is possible to easily achieve improvement of traction performance and suppression of uneven wear of the block. The length of the protruding portion 24A in the tire axial direction may be equal to or shorter than the length of the slit 21A and may be 80% to 100% or 80% to 95% of the length of the slit 21A.

The width as well as height of the protruding portion 24A gradually decrease toward the distal end. The protruding portion 24A has the ridge 29A tilted at an angle that is substantially constant, and the height of the ridge 29A decreases toward the distal end of the protruding portion 24A. Note that, unless otherwise stated, the distal end of the ridge 29A is the distal end of the protruding portion 24A. The stone ejector 60A is disposed at a position facing the distal end of the protruding portion 24A, with a predetermined interval therebetween. The predetermined interval is, for example, 7.0 mm to 12.0 mm.

The protruding portion 24A is positioned at the intersection point of the shoulder main groove 12A and the lateral groove 14 and can be regarded as branching the grooves. Accordingly, the sidewall of the protruding portion 24A forms the groove walls of the shoulder main groove 12A and the lateral groove 14. The sidewall of the protruding portion 24A is tilted such that the width of the protruding portion 24A increases toward the groove bottoms. The sidewall of the protruding portion 24A includes a first region 25A that is a tilted surface having a larger tilt angle relative to the normal to the profile surface P than other portions of the sidewall of the first center block 20A. The first region 25A is preferably formed on both sides of the protruding portion 24A in the width direction, in other words, its sidewalls along the shoulder main groove 12A and the lateral groove 14. The first region 25A of the protruding portion 24A enlarges the surface area of the protruding portion 24A without increasing the ground contact width of the protruding portion 24A on paved roads, thereby significantly contributing to both traction performance during off-road driving and steering stability during paved road driving. For a tire intended for off-road driving, it is preferable to increase the ground contact width, thereby improving traction performance on muddy roads, sandy surfaces, and the like. On the other hand, the ground contact width needs to be set to be small to improve steering stability on paved roads. However, if the ground contact width is reduced, floatation cannot be obtained on muddy roads, sandy surfaces, and the like, which increases the likelihood of becoming stuck. Thus, it is not easy to achieve both traction performance during off-road driving and steering stability during paved road driving, but according to the pneumatic tire 1, it is possible to effectively balance the performances by forming a tilted surface with a large tilt on the protruding portion 24A.

The first region 25A is preferably formed at the interior of the slit 21A beyond the range of the protruding portion 24A. On the block sidewall on the shoulder main groove 12A side, the first region 25A is formed from the distal end of the protruding portion 24A to the interior of the slit 21A, more preferably to the terminal end of the slit 21A. In addition, on the block sidewall along the lateral groove 14, also, the first region 25A is formed across the entire length of the sidewall beyond the range of the protruding portion 24A. By expanding the formation range of the first region 25A, the above-described effect of the first region 25A becomes more pronounced.

The protruding portion 24A includes the ridge 29A formed through intersection of two first regions 25A on both sides in the width direction. The ridge 29A is the boundary between the two first regions 25A and is tilted so as to approach the groove bottom toward the distal end of the protruding portion 24A. As illustrated in FIG. 10 (cross-sectional view along the ridge 29A), the ridge 29A is tilted at an angle that is substantially constant from the stepped portion 23A toward the distal end of the protruding portion 24A. A tilt angle θ2 of the ridge 29A relative to a normal N2 is, for example, 50° to 60° and is smaller than the tilt angle θ1 of the bottom surface of the slit 21A and larger than a tilt angle θ3 (refer to FIG. 11 to be described later) of each first region 25A. The normal N2 is a normal to the profile surface P passing through the upper end of the ridge 29A.

Each first region 25A is formed deeper toward the distal end of the protruding portion 24A, but since the height of the protruding portion 24A is gradually lower toward the distal end, the height of the first region 25A is maximum at a position corresponding to the upper end of the ridge 29A, in other words, the distal end of the stepped portion 23A. Each first region 25A may be formed on the entire range of the sidewall of the protruding portion 24A, but the sidewall of the protruding portion 24A preferably includes a second region 26A formed substantially orthogonal to the profile surface P, and a curved surface 27A connecting the second region 26A and the groove bottom. By deeply forming each first region 25A on the sidewall of the protruding portion 24A, it is possible to effectively reinforce the protruding portion 24A, and as a result, the block rigidity is improved and uneven wear is suppressed.

The second region 26A is formed between a first region 25A and the curved surface 27A, whereas the first region 25A and the curved surface 27A contact each other at the distal end position of the ridge 29A. In other words, the second region 26A is not present at the distal end position of the ridge 29A. The curved surface 27A is a surface that is curved so as to be convex toward the lower inner side of the first center block 20A. Although curved surfaces are also formed in the vicinity of the groove bottom on other sidewalls of the first center block 20A and other blocks, the curved surface 27A formed on the protruding portion 24A preferably has a larger curvature radius and a more gradual curvature than those of the other curved surfaces. In this case, stress acting on the base of the protruding portion 24A can be easily dispersed. The curvature radius of the curved surface 27A is, for example, 3.5 mm to 4.5 mm.

The first region 25A on the block sidewall on the shoulder main groove 12A side is formed in a triangular shape with apexes at the upper end of the ridge 29A (the distal end of the stepped portion 23A), the lower end (distal end) of the ridge 29A, and the terminal end of the slit 21A. The first region 25A on the block sidewall on the lateral groove 14 side is formed in a triangular shape with apexes at the upper end of the ridge 29A, the lower end of the ridge 29A, and the upper end of a block corner positioned at the intersection point of the center main groove 11 and the lateral groove 14. In this case, in the protruding portion 24A and its vicinity, it is possible to expand the surface area of the block without increasing the ground contact width and widely disperse force acting on the protruding portion 24A.

The maximum height of each first region 25A is preferably equal to or greater than 30% of the depths of the shoulder main groove 12A and the lateral groove 14, and more preferably 50% to 80%. In this case, the effect of the first region 25A becomes more pronounced. Note that, in the present embodiment, the depths of the shoulder main groove 12A and the lateral groove 14 are substantially equal to each other. As illustrated in FIG. 11 (cross-sectional view of the lateral groove 14 in the width direction), the first region 25A is tilted at an angle that is substantially constant from the stepped portion 23A toward the groove bottom. The tilt angle θ3 of the first region 25A relative to a normal N3 is, for example, 15° to 50°. The normal N3 is a normal to the profile surface P passing through the upper end of the first region 25A.

The tilt angle θ3 of each first region 25A is more preferably 20° to 40° and particularly preferably 20° to 30°. The tilt angle θ3 of the first region 25A is smaller than the tilt angle θ1 of the bottom surface of the slit 21A and the tilt angle θ2 of the ridge 29A. With the tilt angle θ3 in this range, it is possible to more effectively achieve both traction performance during off-road driving and steering stability during paved road driving. Note that steering stability during paved road driving degrades when the tilt angle θ3 is too small, and traction performance degrades when the tilt angle θ3 is too large. The second region 26A formed between the first region 25A and the curved surface 27A is preferably substantially orthogonal to the profile surface P at a tilt angle smaller than 5°.

In the present embodiment, the stepped portion 23A is formed on the uppermost surface of the protruding portion 24A, and no contact area is present on the protruding portion 24A. In a plan view of the protruding portion 24A, the first region 25A occupies a majority of the protruding portion 24A, corresponding to at least 50% of its area. In this case, it is possible to easily suppress uneven wear of the protruding portion 24A, thereby more effectively achieving both traction performance during off-road driving and steering stability during paved road driving.

As illustrated in FIGS. 7 to 9, the shoulder main groove 12A is formed with the groove bottom protrusion 28A in which the groove bottom is raised from a portion adjacent to the opening portion 21Ed of the slit 21A so as to connect to the protruding portion 24A. As described above, the shoulder main groove 12A is bent at the base of the protruding portion 24A, and the groove bottom protrusion 28A is formed at the bent portion. The groove bottom protrusion 28A reinforces the base of the protruding portion 24A and suppresses motion of the protruding portion 24A. As a result, uneven wear of the protruding portion 24A is effectively suppressed. In other words, the protruding portion 24A is reinforced by the groove bottom protrusion 28A and reduction in the block rigidity is suppressed. The groove bottom protrusion 28A is formed so as to couple the bottom surface of the slit 21A and the sidewall of the protruding portion 24A.

The height of the groove bottom protrusion 28A is preferably equal to or greater than 3% of the depth of the shoulder main groove 12A, and more preferably equal to or greater than 5% thereof. In this case, the above-described effect of the groove bottom protrusion 28A becomes more pronounced. The height of the groove bottom protrusion 28A is not particularly limited from the perspective of suppression of uneven wear of the protruding portion 24A, but is preferably equal to or smaller than 50% of the depth of the shoulder main groove 12A, more preferably equal to or smaller than 30%, and particularly preferably equal to or smaller than 15%, from the perspective of improvement of drainage performance and mud discharge performance, in particular. A preferable range of the height of the groove bottom protrusion 28A is, for example, 5% to 50%, 5% to 30%, 5% to 15%, or 5% to 10% of the depth of the shoulder main groove 12A.

The groove bottom protrusion 28A may be formed higher than the bottom surface of the slit 21A at the opening portion 21Ed, but in the present embodiment, is formed at the same height as the bottom surface of the slit 21A. In this case, there is no height difference nor step between the upper surface of the groove bottom protrusion 28A and the bottom surface of the slit 21A. In addition, a flat region with a substantially constant height is present on the upper surface of the groove bottom protrusion 28A. The flat upper surface of the groove bottom protrusion 28A is connected to the deepest portion of the groove with a curved surface 28Ac in between, and the base of the protruding portion 24A on the shoulder main groove 12A side is formed in a stepped shape, the upper step of which is the upper surface of the groove bottom protrusion 28A and the lower step of which is the deepest portion of the groove.

The groove bottom protrusion 28A is preferably formed with a width equal to or greater than 80% of the opening width (length of the opening portion 21Ed along the virtual line) of the slit 21A at the portion adjacent to the opening portion 21Ed of the slit 21A. In this case, the above-described effect of the groove bottom protrusion 28A becomes more pronounced. In the present embodiment, the groove bottom protrusion 28A is formed across the entire opening width of the slit 21A. In this case, the protruding portion 24A and the block end 20Ed positioned on the opposite side of the protruding portion 24A with the slit 21A interposed therebetween are coupled to each other by the groove bottom protrusion 28A, which enhances a reinforcement effect against reduction in the rigidity of the protruding portion 24A.

The groove bottom protrusion 28A extends along the protruding portion 24A from the portion adjacent to the opening portion 21Ed of the slit 21A toward the distal end of the protruding portion 24A. The groove bottom protrusion 28A includes the portion (hereinafter referred to as "base portion") adjacent to the opening portion 21Ed of the slit 21A, and a portion (hereinafter referred to as "extension portion") extending along the protruding portion 24A from the base portion. The extension portion is connected to the curved surface 27A of the protruding portion 24A across the entire length. By forming the extension portion, the area connected to the protruding portion 24A increases, which enhances the reinforcement effect of the protruding portion 24A. It is preferable that the extension portion extends toward the distal end of the protruding portion 24A beyond a position corresponding to the upper end of the ridge 29A, and is formed over a range that does not exceed the distal end of the protruding portion 24A.

The extension portion of the groove bottom protrusion 28A has a narrowing shape with a width gradually decreasing toward the distal end of the protruding portion 24A. Since the extension portion has such a narrowing shape that the width of the shoulder main groove 12A gradually increases toward the intersection point with the lateral groove 14, it is possible to ensure favorable drainage performance and mud discharge performance while reinforcing the protruding portion 24A. The width of the extension portion may decrease in stages but preferably decreases continuously. In the present embodiment, the distal end of the extension portion is pointed and connected to the curved surface 27A at a position close to the distal end of the protruding portion 24A.

The groove bottom protrusion 28A is formed over a range equal to or less than half of the width of the groove on the first shoulder block 40A side in the width direction of the shoulder main groove 12A. In other words, the groove bottom protrusion 28A is not formed so as to extend across the shoulder main groove 12A. The groove bottom protrusion 28A is formed along the sidewall of the first shoulder block 40A over a range that does not exceed the deepest portion of the shoulder main groove 12A. In this case, the protruding portion 24A can be reinforced without impairing the drainage function of the shoulder main groove 12A.

As illustrated in FIG. 12 (cross-sectional view of a portion extending from the contact area of the portion adjacent to the slit 21A to the groove bottom through the groove bottom protrusion 28A), the corner of the first center block 20A including the protruding portion 24A is a block end that is formed at an acute angle with a narrowing distal end and has a stepped shape formed in a stepped manner from the contact area toward the groove bottom. The stepped shape is a three-step shape including a first step S1 (uppermost step) including the stepped portion 23A, a second step S2 (intermediate step) including the first region 25A and the upper surface of the groove bottom protrusion 28A, and a third step S3 (lowermost step) including the curved surface 28Ac connected to the deepest portion of the groove. The stepped shape may be a stepped shape with four or more steps but is preferably a three-step shape. Note that the number of steps of the stepped shape is counted from the contact area side of the first center block 20A toward the groove bottom.

The corner of the first center block 20A including the protruding portion 24A has a triangular shape in a plan view and is formed at an angle $\theta_{20}$ (refer to FIG. 3). The angle $\theta_{20}$ is the angle between block ends that approach each other toward the distal end of the corner, and is, for example, 20° to 65° and preferably 20° to 50° or 30° to 50°. The corner of the first center block 20A including the protruding portion 24A faces the shoulder main groove 12A and is positioned at the intersection point of the shoulder main groove 12A and the lateral groove 14. Such a portion tends to have high ground contact pressure and local reduction in the block rigidity, and thus is particularly susceptible to uneven wear of the block.

In the present embodiment, through reinforcement with the groove bottom protrusion 28A and the stepped shape, it is possible to ensure excellent traction performance while effectively suppressing uneven block wear. In the stepped shape, the height of the first step S1 is higher than the height of the third step S3, and the height of the second step S2 including the first region 25A is highest. In this case, reduction in the block rigidity can be more effectively suppressed by the effect of the first region 25A. The second step S2 includes the first region 25A, the second region 26A, the curved surface 27A, and the upper surface of the groove bottom protrusion 28A. The height of the first region 25A is highest among the steps constituting the stepped shape.

The stepped portion 23A constituting the first step S1 of the stepped shape disperses ground contact pressure acting on the corner of the first center block 20A and contributes to the uniformity of the ground contact pressure. Each above-described surface of the second step S2 reinforces the corner and suppresses reduction in rigidity. Similarly to the curved surface 27A, the curved surface 28Ac constituting the third step S3 is curved so as to be convex toward the inside of the first center block 20A and suppresses cracking of the groove bottom. With the synergistic effect of the steps, it is possible to ensure excellent traction performance while effectively suppressing uneven wear of the block.

Each step constituting the stepped shape includes a gradually tilted surface with a tilt angle equal to or greater than 55° relative to the normal to the profile surface P, or a substantially flat surface along the profile surface P. The length of the gradually tilted surface or flat surface is preferably equal to or longer than 0.5 mm in the direction in which each step is formed, and more preferably equal to or longer than 1.0 mm. Note that the lowermost step includes a substantially flat groove bottom surface. In other words, a tilted surface or flat surface that satisfies this condition is counted as one step, and a shape in which three or more steps are consecutively formed is defined as a stepped shape.

Figure 13:
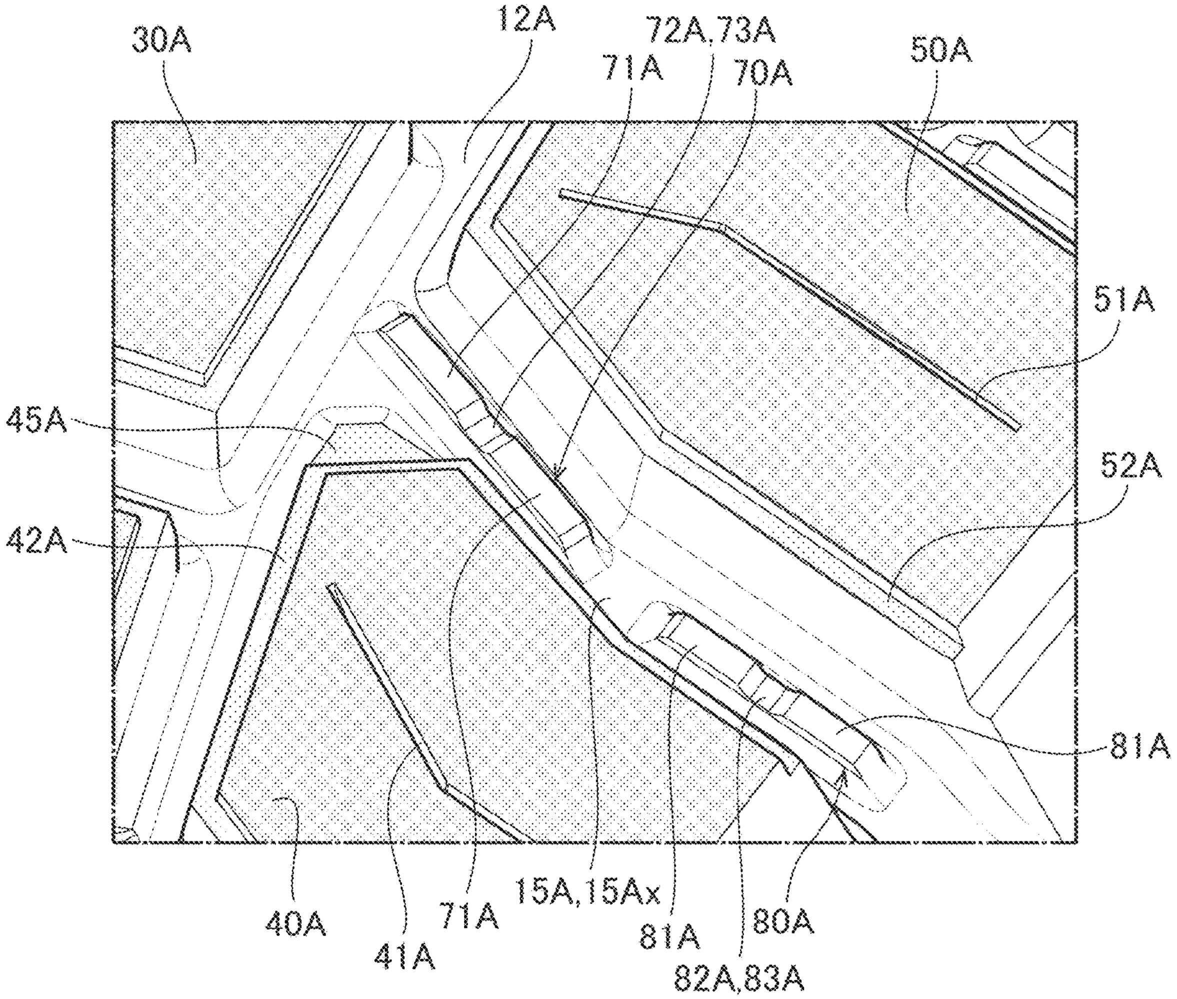
FIG. 13 is a perspective view of stone ejectors and their vicinity.
Figure 14:
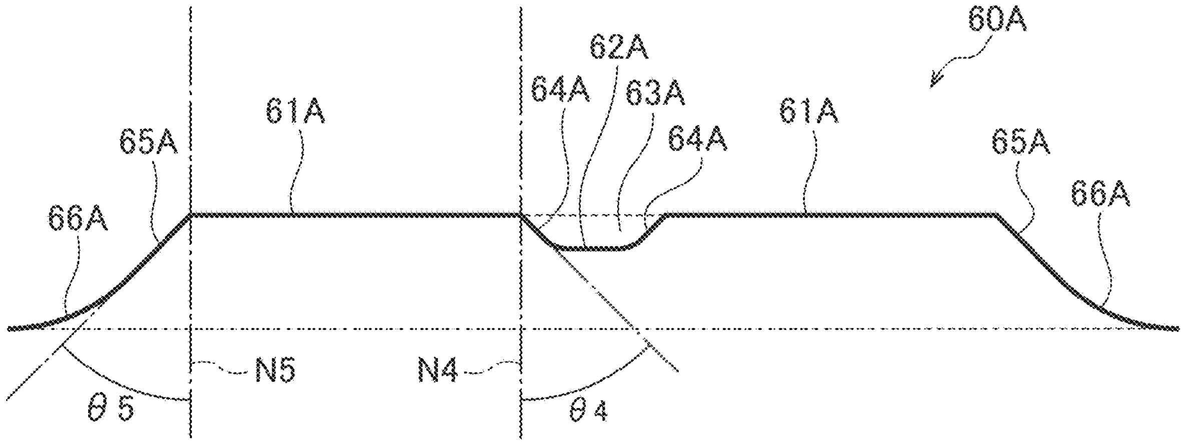
FIG. 14 is a cross-sectional view along line EE in FIG. 3.
Figure 15:
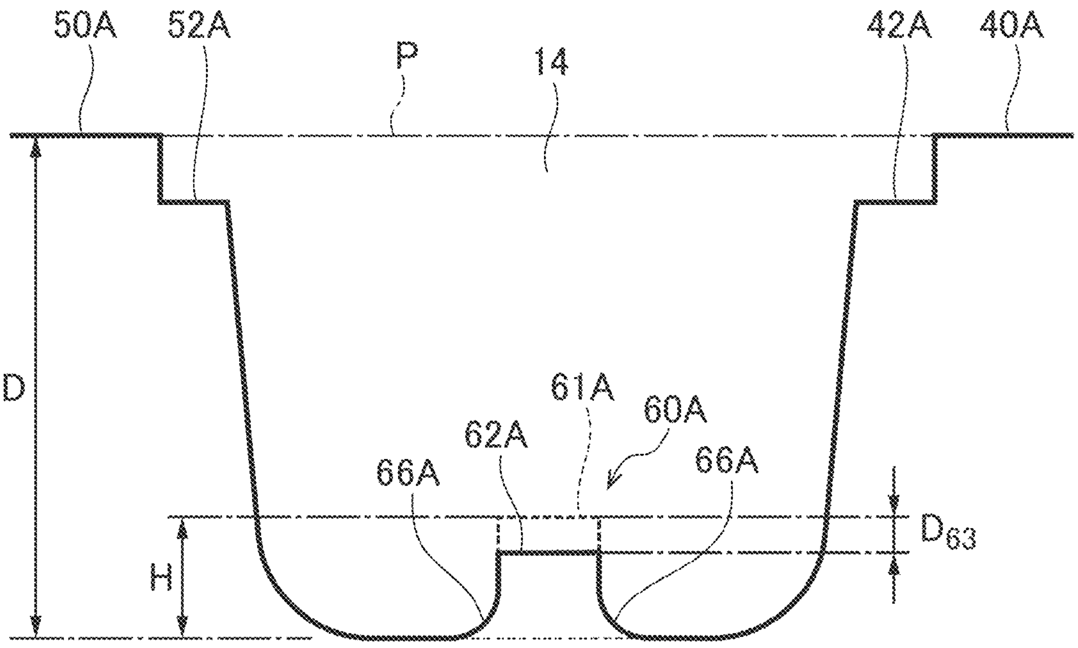
FIG. 15 is a cross-sectional view along line FF in FIG. 3.

The stone ejectors 60A, 70A, and 80A will be described below in further detail with reference to FIGS. 7 and 13 to 15. FIG. 13 is a perspective view of the stone ejectors 70A and 80A and their vicinity. FIG. 14 is a cross-sectional view (cross-sectional view along line EE in FIG. 3) of the stone ejector 60A taken in the length direction, and FIG. 15 is a cross-sectional view (cross-sectional view along line FF in FIG. 3) of each lateral groove 14, in which the stone ejector 60A is disposed, taken in the width direction, and those diagrams will be referred to as appropriate.

As illustrated in FIGS. 7 and 13, the stone ejector 60A is formed at the bottom of each lateral groove 14, and the stone ejectors 70A and 80A are formed at the bottom of each lateral groove 15A. The stone ejectors 60A, 70A, and 80A are protrusions for suppressing stone retention, which extend along the corresponding lateral groove. In the shoulder region on the right side on the tread 10, the lateral grooves 14 in which the one stone ejector 60A is formed and the lateral grooves 15A in which the two stone ejectors 70A and 80A are formed are alternately arranged in the tire circumferential direction (refer to FIG. 2, for example). The stone ejectors 60A and 80A are disposed in the tire axial direction, and the stone ejector 70A is disposed with a tilt relative to the tire axial direction.

Note that the stone ejectors 60B, 70B, and 80B (refer to FIG. 2) are disposed in the shoulder region on the left side on the tread 10. The stone ejectors 60B, 70B, and 80B have the same shapes as the stone ejectors 60A, 70A, and 80A, respectively.

Although the stone ejectors 60A, 70A, and 80A are each an elongated protrusion that extends along a lateral groove and have similar shapes, the length of the stone ejector 60A or the stone ejector 70A is longest and the length of the stone ejector 80A is shortest. The lengths of the stone ejectors 60A and 70A may be equal. The widths of the stone ejectors may be different from one another but are substantially equal in the present embodiment. The stone ejector 60A is formed from the ground contact end E1 to the vicinity of the distal end of the protruding portion 24A. The stone ejector 80A is formed from the ground contact end E1 to a bent portion 15Ax of the lateral groove 15A. The stone ejectors 60A and 80A may partially extend to the buttress region 4 beyond the ground contact end E1.

As illustrated in FIG. 7, a recessed portion 63A that is recessed such that the height of the stone ejector 60A decreases is formed at an intermediate portion of the stone ejector 60A in the length direction. When the tread comes into contact with the road surface, the shape of a protrusion formed at the groove bottom changes due to a load, but shape change in the length direction is unlikely to occur to a stone ejector having a constant height in the length direction. In this case, stones cannot be expelled by the stone ejector, and stones lodged in the groove cannot be effectively discharged. With the stone ejector 60A, stones lodged in the lateral groove 14 can be easily expelled by the effect of the recessed portion 63A.

The stone ejector 60A is curved such that both end portions in the length direction bend upward when surrounding blocks come into contact with on the road surface, and is curved such that the central portion in the length direction becomes convex outward in the tire radial direction when the blocks leave the road surface, returning to the original shape. A portion where the recessed portion 63A is formed has reduced rigidity and is susceptible to deformation, and thus the stone ejector 60A is curved starting from the position of the recessed portion 63A. The stone ejector 60A is largely curved in the length direction and can expel stones lodged in the lateral groove 14 with strong force. As a result, degradation in traction performance due to stone retention is suppressed.

The stone ejector 60A has, for example, a length of 24.0 mm to 43.0 mm and a width of 2.5 mm to 3.5 mm. The number of recessed portions 63A may be equal to or greater than two, but is preferably one for a length of this extent. In a case where the number of recessed portions 63A is one, the recessed portion 63A is preferably formed at a central portion of the stone ejector 60A in the length direction. In the present embodiment, the recessed portion 63A is formed at a position an equal distance from both ends of the stone ejector 60A in the length direction. In this case, the stone ejector 60A is more likely to bend or curve in the length direction around a portion where the recessed portion 63A is formed, and the above-described effect of the recessed portion 63A becomes more pronounced.

The stone ejector 60A includes a first portion 61A that is a portion where the recessed portion 63A is not present, and a second portion 62A that is a portion where the recessed portion 63A is formed and the height is decreased. In the present embodiment, since one recessed portion 63A is formed at the central portion of the stone ejector 60A in the length direction, first portions 61A with the same length are formed on the respective sides of the second portion 62A (recessed portion 63A) in the length direction. In other words, the stone ejector 60A has a structure in which the two first portions 61A are connected to each other through the second portion 62A. The second portion 62A has a function to improve elastic force of the stone ejector 60A, thereby increasing force to expel stones.

As illustrated in FIG. 14, a tilted surface 64A that is tilted in the length direction is formed at the boundary between each first portion 61A and the second portion 62A. In this case, height gradually changes, which allows stress acting on the boundary to be dispersed to improve the durability of the stone ejector 60A. Note that portions including the tilted surfaces 64A belong to the second portion 62A. The upper surface of the second portion 62A that is substantially flat in the length direction is formed between the two tilted surfaces 64A. In other words, the recessed portion 63A has a substantially trapezoidal shape in a sectional view (side view) of the stone ejector 60A in the length direction. Each first portion 61A has a height that is substantially constant except for end portions in the length direction. In addition, the heights of the two first portions 61A are substantially equal to each other.

Tilted surfaces 65A that are tilted in the length direction are formed at respective end portions of the stone ejector 60A in the length direction. Each first portion 61A includes a tilted surface 65A, and an upper surface formed substantially flat in the length direction between the tilted surfaces 64A and 65A. The tilted surfaces 65A are connected to the deepest portion of the groove through curved surfaces 66A. Since the shape of the stone ejector 60A changes significantly in the length direction, the curved surfaces 66A are preferably formed to reduce stress acting on the groove bottom. A tilt angle θ4 of each tilted surface 64A relative to a normal N4 and a tilt angle θ5 of each tilted surface 65A relative to a normal N5 are, for example, substantially equal angles and preferably 40° to 50° or 45°+3°. The normals N4 and N5 are normals to the profile surface P passing through the upper ends of the tilted surfaces 64A and 65A, respectively.

The length of each first portion 61A is preferably longer than the length of the second portion 62A, for example, two to six times larger than the length of the second portion 62A, and is more preferably 3.5 to 5 times larger. By sufficiently ensuring the sizes of the first portions 61A, stones can be expelled with strong force. The second portion 62A (recessed portion 63A) preferably has a length such that the first portions 61A do not contact each other when the stone ejector 60A deforms in the length direction, and the length is, for example, 3.0 mm to 5.0 mm. In length comparison between each first portion 61A and the second portion 62A, the length of the first portion 61A is the length of a range with a constant height, and the length of the second portion 62A (recessed portion 63A) is the interval between the upper ends of the tilted surfaces 64A.

As illustrated in FIG. 15, a maximum height H of each first portion 61A is, for example, 2.5 mm to 3.5 mm and is preferably 5% to 40% of a depth D of the lateral groove 14, and more preferably 15% to 25%. In this case, mud, stones, and the like can be taken into the lateral groove 14, and it is possible to ensure excellent traction performance while ensuring sufficient force to expel stones. Moreover, a maximum depth D63 of the recessed portion 63A is preferably 20% to 50% of the height H of each first portion 61A, and more preferably 25% to 40%. In other words, the height of the second portion 62A is preferably 50% to 80% or 60% to 75% of the height of each first portion 61A. In this case, the deformation amount and elastic force of the stone ejector 60A in the length direction between ground contact and non-contact states of the tread 10 become greater, which increases force to expel stones lodged in the lateral groove 14.

The stone ejector 60A is disposed at a central portion of the lateral groove 14 in the width direction and is formed with the curved surfaces 66A on both sides in the width direction. With the curved surfaces 66A, the stone ejector 60A has a shape such that the width is gradually expanded toward the deepest portion of the groove.

As illustrated in FIG. 13, the lateral groove 15A is formed with the two stone ejectors 70A and 80A arranged in the direction in which the groove extends. The stone ejectors 70A and 80A are divided at the bent portion 15Ax of the lateral groove 15A and spaced apart from each other in the length direction of the lateral groove 15A with the bent portion 15Ax interposed therebetween. The lateral groove 15A is formed with the bent portion 15Ax at an intermediate portion and tilted at the angle of 15° to 25° relative to the tire axial direction. In the lateral groove 15A, the stone ejector 80A is disposed at a portion aligned with the tire axial direction, and the stone ejector 70A is disposed at a portion tilted relative to the tire axial direction. The stone ejector 70A is tilted at the same angle as the lateral groove 15A relative to the tire axial direction.

The stone ejectors 70A and 80A can be connected into one protrusion, but in this case, when the ejectors deform, rubber accumulates at bent portions of the ejectors, which may cause cracking. Furthermore, force to expel stones may dissipate in the tire circumferential direction and decrease. Such defects can be prevented by disposing the straight stone ejectors 70A and 80A at an interval so as not to interfere with each other. However, stones may be lodged in the bent portion 15Ax when the interval between the stone ejectors 70A and 80A is too large, and thus the interval between the ejectors is set to be, for example, equal to or shorter than 1.5 times the lengths of recessed portions 73A and 83A, or equal to or shorter than the lengths of the recessed portions 73A and 83A in terms of straight-line distance.

Similarly to the stone ejector 60A, the stone ejectors 70A and 80A each include the recessed portion 73A and 83A at a position that is an equal distance from both ends in the length direction. The stone ejectors 70A and 80A also include first portions 71A and 81A that are portions where the recessed portions 73A and 83A is not present, and second portions 72A and 82B that are portions where the recessed portions 73A and 83A are formed and the height is decreased, respectively. Note that dimensions and the like, such as the shapes of the stone ejectors 70A and 80A, the length ratio of the first and second portions, the depths of the recessed portions 73A and 83A, and the height of the first portion, are the same as in the case of the stone ejector 60A.

The stone ejector 70A is formed from the bent portion 15Ax of the lateral groove 15A to the intersection point of the shoulder main groove 12A and the lateral groove 15A. At the intersection point of the shoulder main groove 12A and the lateral groove 15A, a large recessed portion is formed and stones are likely to be lodged, and thus the stone ejector 70A preferably extends to a central portion of the shoulder main groove 12A in the width direction. Note that, in the shoulder blocks disposed on both sides of the lateral groove 15A in the width direction, stepped portions 42A and 52A are formed with substantially constant width and depth along the periphery of the block upper surface. The widths and depths of the stepped portions 42A and 52A are the same as those of the stepped portion 23A of the first center block 20A, but the stepped portions 42A and 52A are different from the stepped portion 23A in that they are not formed at part of the periphery of the block upper surface, specifically, at the outer ends in the tire axial direction.

Figure 16:
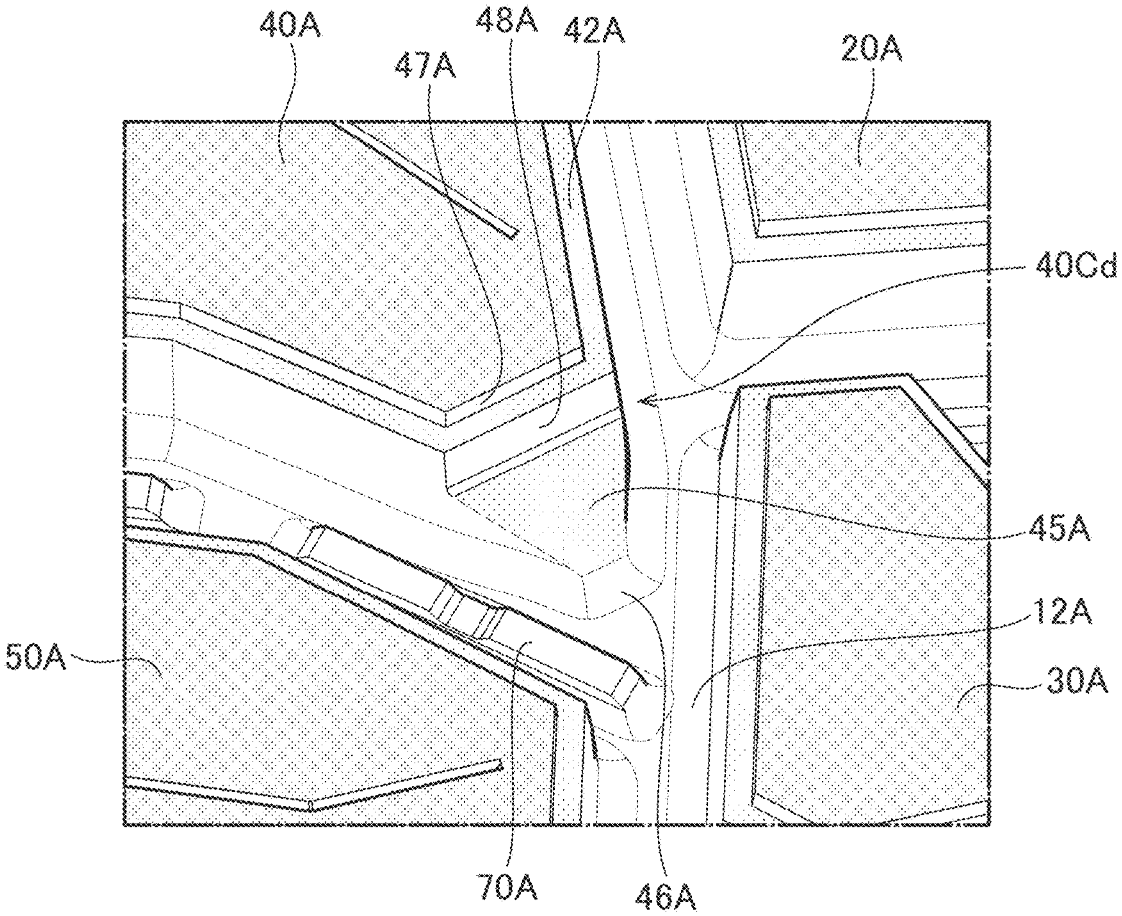
FIG. 16 is a perspective view of a corner of a shoulder block formed in a stepped shape, and its vicinity.
Figure 17:
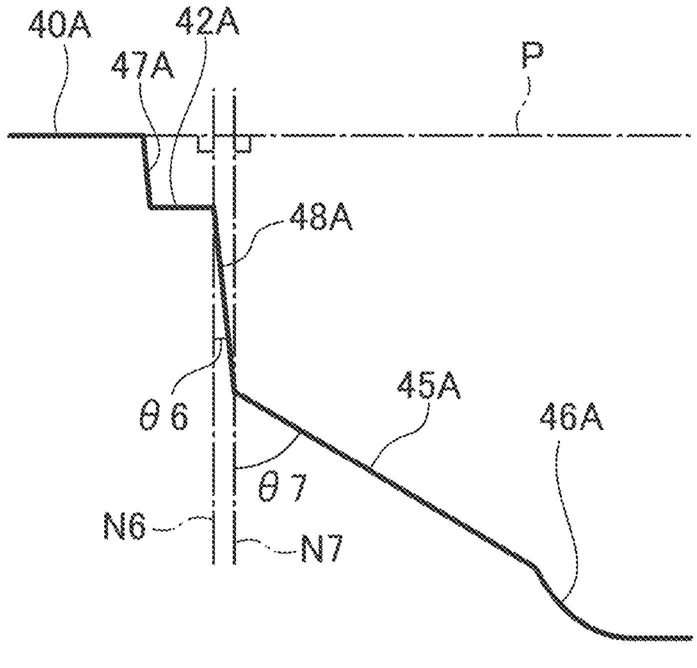
FIG. 17 is a cross-sectional view along line GG in FIG. 3.

A corner 40Cd of the first shoulder block 40A formed in a stepped shape will be described below in further detail with reference to FIGS. 16 and 17. FIG. 16 is a perspective view of the corner 40Cd and its vicinity. FIG. 17 is a cross-sectional view (cross-sectional view along line GG in FIG. 3) of a stepped shape formed at the corner 40Cd.

As illustrated in FIGS. 16 and 17, the first shoulder block 40A has a stepped shape with three or more steps, which includes the tilted surface 45A, at the corner 40Cd positioned at the intersection point of the shoulder main groove 12A and the lateral groove 15A. The tilted surface 45A is formed at the second step from the contact area side of the first shoulder block 40A and has a maximum length toward the outside of the block among the steps constituting the stepped shape. The first shoulder block 40A is bent toward the intersection point of the shoulder main groove 12A and the lateral groove 15A, and the corner 40Cd is formed at an acute angle with a narrowing distal end. A block end formed to protrude at an acute angle, such as the corner 40Cd, tends to have reduced block rigidity, and furthermore, at the edge of the shoulder main groove 12A, the ground contact pressure becomes high and the amount of rubber compression increases, and accordingly, uneven wear is likely to occur.

As described above, the pneumatic tire 1 is designed for off-road driving and formed with portions protruding outward from blocks to increase the number of engagements with mud, rocks, and the like thereby improving traction performance on muddy roads, rocky terrain, sandy surfaces, and the like. However, if portions of blocks are formed to have a protruding shape with an acute angle, the block rigidity is locally reduced and uneven wear of the block becomes likely to occur. Since the corner 40Cd of the first shoulder block 40A faces the shoulder main groove 12A and is positioned at the intersection point of the shoulder main groove 12A and the lateral groove 15A, the corner is a portion particularly susceptible to uneven wear, but a stepped shape is applied thereto so that it is possible to ensure excellent traction performance while effectively suppressing uneven wear of the block.

The corner 40Cd of the first shoulder block 40A is formed in a three-step shape including the first step S1 including the stepped portion 42A, the second step S2 including the tilted surface 45A, and the third step S3 including a curved surface 46A. The corner 40Cd may be formed in a stepped shape with four or more steps but is preferably formed in a three-step shape. Note that the number of steps of the stepped shape of the corner 40Cd is counted from the contact area side of the first shoulder block 40A toward the groove bottom. The corner 40Cd of the first shoulder block 40A has a triangular shape in a plan view and is formed with an angle θ40 (refer to FIG. 3). The angle θ40 is, for example, 20° to 65° and preferably 50° to 60°.

The first step S1 is the uppermost step of the stepped shape, which is positioned on the contact area side of the first shoulder block 40A, and forms a step with the contact area as the upper step and the stepped portion 42A as the lower step. The third step S3 is the lowermost step of the stepped shape and forms a step with the tilted surface 45A as the upper step and the groove bottom as the lower step. The second step S2 is the intermediate step of the stepped shape and forms a step with the stepped portion 42A as the upper step and the tilted surface 45A as the lower step. In the stepped shape, the height of the first step S1 is equal to or less than the height of the third step S3, and the height of the second step S2 is maximum.

The first step S1 includes the stepped portion 42A located one step below the contact area of the first shoulder block 40A, and a first side surface 47A connecting the contact area and the stepped portion 42A. Since the stepped portion 42A has a flat surface substantially parallel to the contact area, the height difference of the first step S1 is substantially equal to the height of the first side surface 47A. The height of the first side surface 47A is, for example, 1.0 mm to 3.0 mm. The tilt angle of the first side surface 47A is preferably equal to or smaller than a tilt angle θ6 of a second side surface 48A of the second step S2. The first step S1 (stepped portion 42A) disperses the ground contact pressure acting on the corner 40Cd, thereby contributing to the uniformity of the ground contact pressure.

The second step S2 includes the tilted surface 45A located one step below the stepped portion 42A, and the second side surface 48A connecting the stepped portion 42A and the tilted surface 45A. The second side surface 48A is preferably a tilted surface that is tilted at an angle equal to or slightly larger than that of the first side surface 47A. Since the second side surface 48A is formed higher than the first side surface 47A and the curved surface 46A, the height difference of the second step S2 is largest. The height of the second side surface 48A is, for example, 4.0 mm to 6.0 mm. The tilt angle θ6 of the second side surface 48A relative to a normal N6 is, for example, 4° to 10° or 6° to 8°. The normal N6 is a normal to the profile surface P passing through the upper end of the second side surface 48A.

The tilted surface 45A is a tapered surface having a triangular or trapezoidal shape in a plan view, the size of which gradually decreases toward the groove bottom. The tilted surface 45A has a tilt angle larger than that of the second side surface 48A and protrudes significantly outward from the block. The tilted surface 45A functions to reinforce the base of the corner 40Cd and suppress reduction in the rigidity of the corner 40Cd. A tilt angle θ7 of the tilted surface 45A relative to a normal N7 is preferably 55° to 80° and more preferably 55° to 70°. The normal N7 is a normal to the profile surface P passing through the upper end of the tilted surface 45A. With the tilt angle θ7 of the tilted surface 45A in this range, the block reinforcement effect becomes more pronounced. The tilt angle θ7 of the tilted surface 45A is, for example, 5 to 15 times larger than the tilt angle θ6 of the second side surface 48A.

The height of the tilted surface 45A is, for example, 90% to 110% of the height of the second side surface 48A and may be substantially equal to the height of the second side surface 48A. The tilted surface 45A has a height equivalent to that of the second side surface 48A but has a tilt angle equal to or greater than five times that of the second side surface 48A, and thus has an area larger than that of the second side surface 48A in a plan view. Since the stepped shape including the large-area tilted surface 45A is provided at the corner 40Cd of the first shoulder block 40A, it is possible to effectively suppress uneven wear of the corner 40Cd while generating floatation on muddy roads, sandy surfaces, and the like, which significantly improves off-road driving performance. The length of the tilted surface 45A is, for example, 7.0 mm to 14.0 mm in a direction in which the steps are formed.

The third step S3 includes the curved surface 46A connecting the tilted surface 45A and the groove bottom. Similarly to curved surfaces formed at other portions of the block sidewall, the curved surface 46A is curved so as to be convex toward the inside of the first shoulder block 40A. Since the tilted surface 45A of the second step S2 is a tapered surface having a narrowing shape in which the width gradually decreases toward the groove bottom, stress is likely to concentrate on and crack the groove bottom if the tilted surface 45A is connected to the groove bottom. By forming the curved surface 46A, cracking of the groove bottom can be effectively suppressed. In the present embodiment, the tilted surface 45A is formed in a trapezoidal shape in a plan view, and the curved surface 46A is formed from the base of the trapezoid to the groove bottom. For example, the curved surface 46A has a curvature radius of 2.0 mm to 4.0 mm and a height of 1.5 mm to 2.5 mm.

As described above, the second step S2 including the tilted surface 45A is formed between the stepped portion 42A constituting the uppermost step and the curved surface 46A constituting the lowermost step and has the maximum height, and thus it is possible to effectively suppress reduction in the rigidity of the corner 40Cd of the first shoulder block 40A. As a result, it is possible to ensure excellent traction performance while effectively suppressing uneven wear of the corner 40Cd, which significantly improves the durability of the first shoulder block 40A.

The stepped shape formed at the corner 40Cd of the first shoulder block 40A is positioned overlapping, in the tire circumferential direction, the stepped shape formed at the corner of the first center block 20A including the protruding portion 24A. In other words, the stepped shape of the corner 40Cd of the first shoulder block 40A and the stepped shape of the corner of the first center block 20A including the protruding portion 24A are alternately arranged in the tire circumferential direction. With repetition of such a structure in the tire circumferential direction, it is possible to effectively balance excellent driving performance and durability.

Figure 18:
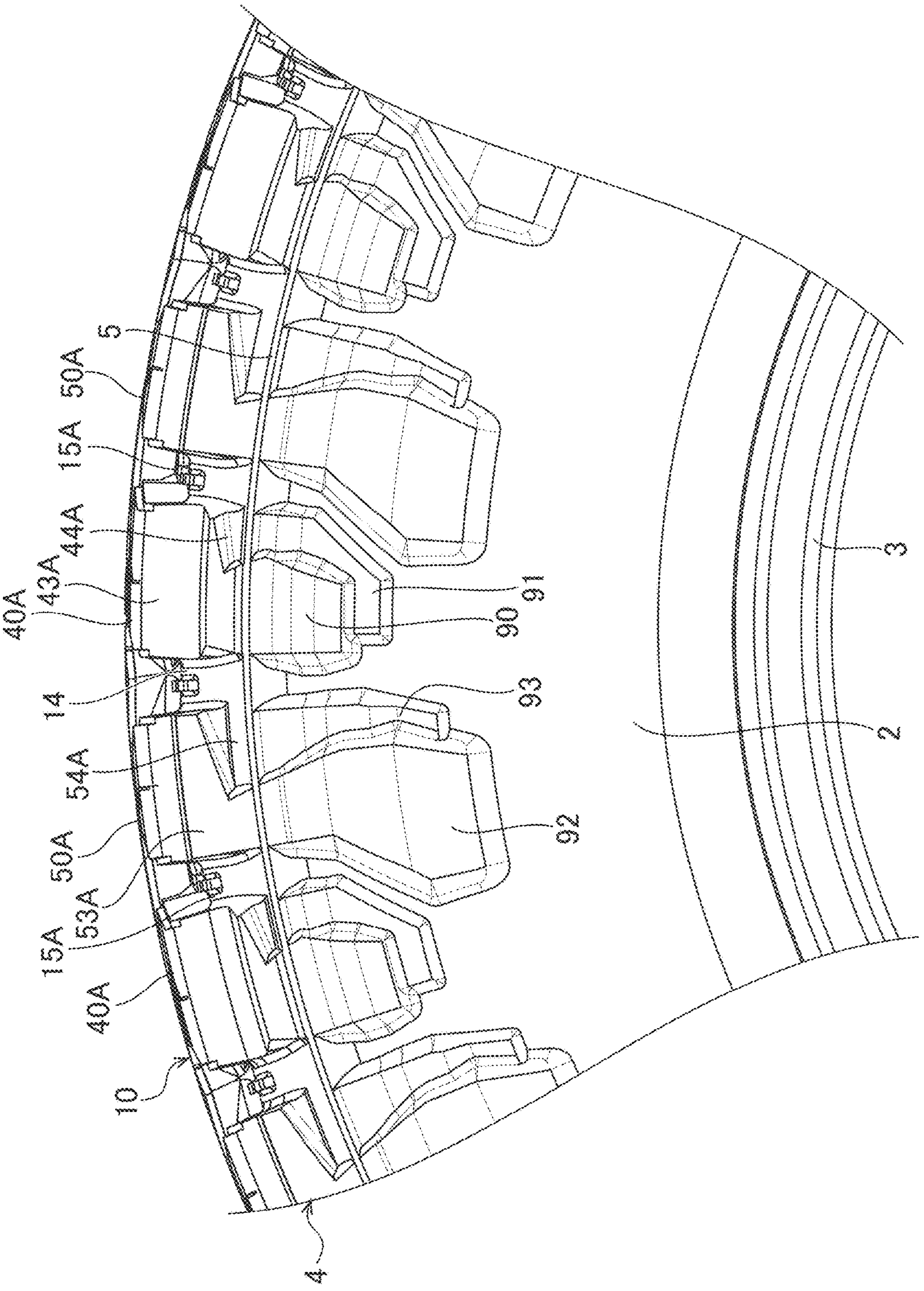
FIG. 18 is a side view of the pneumatic tire as an example of the embodiment.
Figure 19:
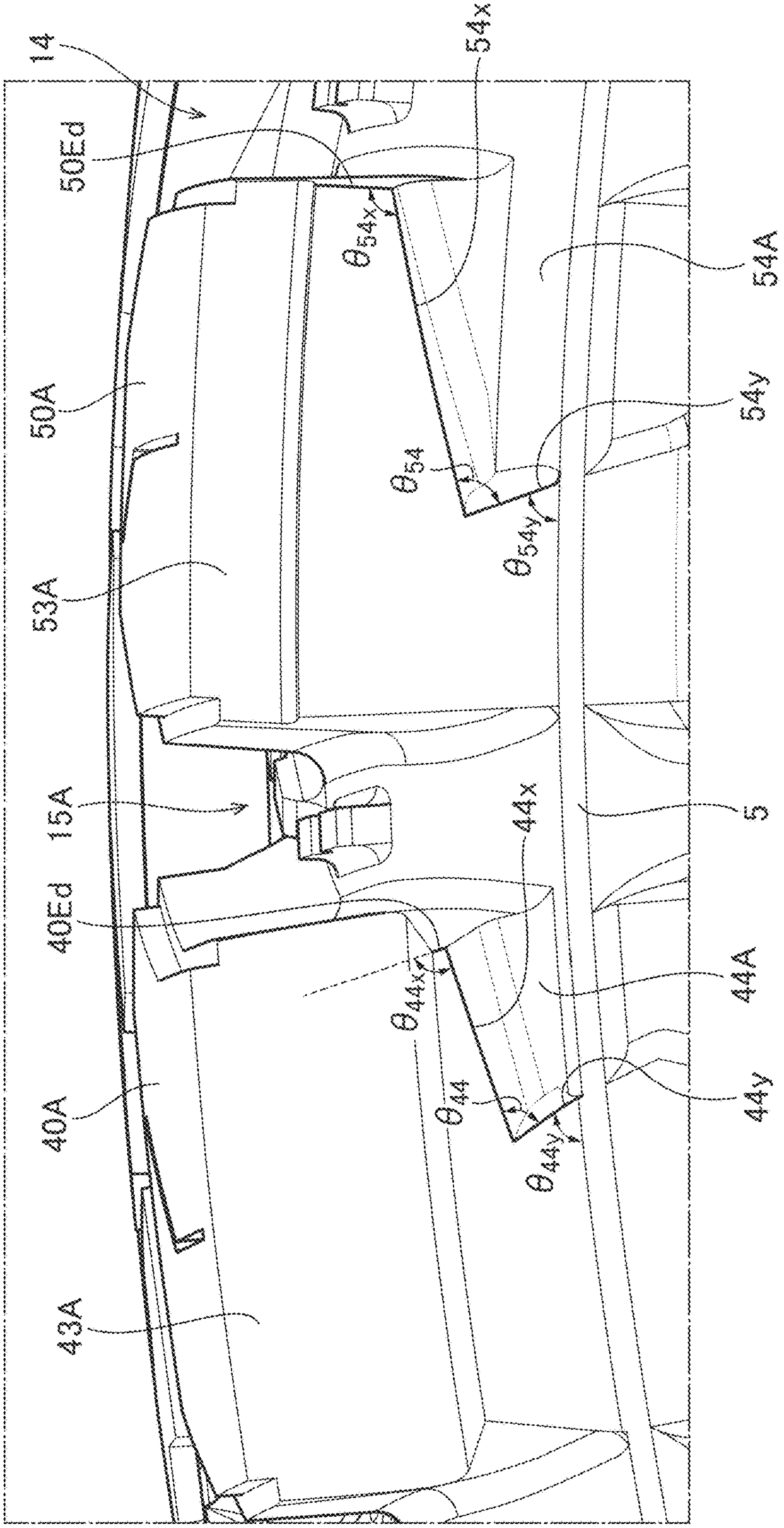
FIG. 19 is a side view of the pneumatic tire as an example of the embodiment, illustrating part of a buttress region in an enlarged manner.
Figure 20:
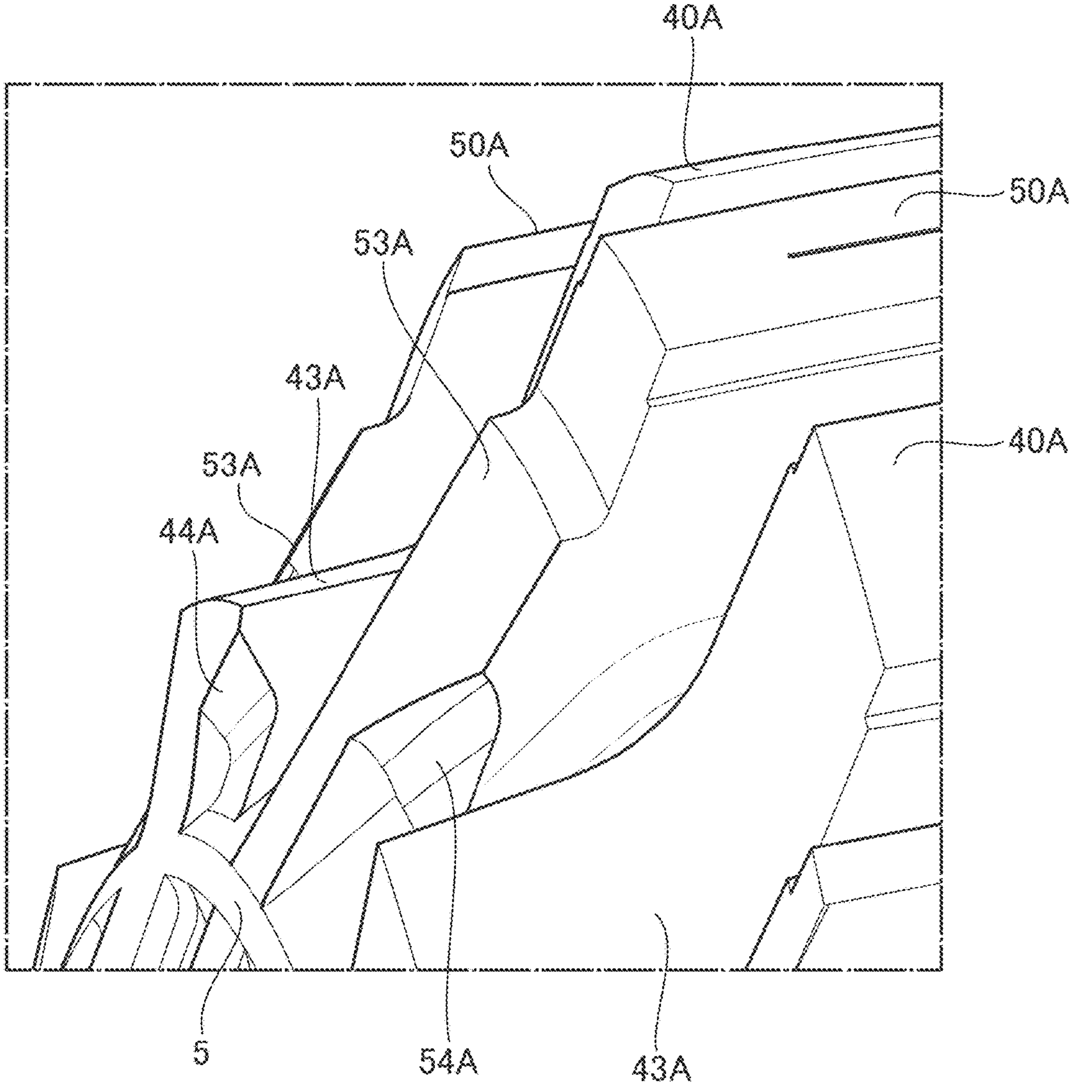
FIG. 20 is a perspective view of the buttress region.

Each buttress region 4 will be described below in further detail with reference to FIGS. 18 to 20. FIG. 18 is a side view of the pneumatic tire 1, and FIG. 19 is a side view of the pneumatic tire 1, illustrating the buttress region 4 in an enlarged manner. FIG. 20 is a perspective view of the buttress region 4.

As illustrated in FIG. 18, irregularities are formed in the tire circumferential direction on each side surface of the pneumatic tire 1. The side blocks 90, 91, 92, and 94 having mutually different shapes and sizes are formed on each sidewall 2, and the first and second shoulder blocks 40A and 50A are alternately arranged in the tire circumferential direction, thereby forming irregularities on each buttress region 4. The irregularities on the sidewall 2 and the buttress region 4 improve side traction performance of the pneumatic tire 1 and enhance aggressive impression. Moreover, the side blocks effectively suppress side cut of the pneumatic tire 1.

In each buttress region 4, the lateral grooves 14 and 15A are formed up to the side rib 5, dividing the first and second shoulder blocks 40A and 50A. The recessed portion 44A is formed on the sidewall 43A of each first shoulder block 40A, and the recessed portion 54A is formed on the sidewall 53A of each second shoulder block 50A. As described later in detail, in a tire side view, edges of the recessed portions 44A and 54A each include a long side extending long in the tire circumferential direction, and a short side extending inward in the tire radial direction from one end of the long side, and the angle between the sides is set to 55° to 100°. Each recessed portion 44A is opened in the tire circumferential direction so as to connect to the corresponding lateral groove 15A, and each recessed portion 54A is opened in the tire circumferential direction so as to connect to the corresponding lateral groove 14.

On each sidewall 2, the side blocks 90 and 91 are disposed alongside the first shoulder blocks 40A in the tire radial direction, and the side blocks 92 and 93 are disposed alongside the second shoulder blocks 50A in the tire radial direction. The side blocks 90 and 91 are connected to each other and integrated but have different protrusion heights to form a step at their boundary. Similarly, the side blocks 92 and 93 are connected to each other and integrated but have different protrusion heights to form a step at their boundary.

The side block 90 protrudes farther outward in the tire axial direction than the side block 91 and also has a larger area in a tire side view. The side blocks 92 and 93 extend farther inward in the tire radial direction than the side blocks 90 and 91. The side block 92 protrudes farther outward in the tire axial direction than the side block 93 and also has a larger area in a tire side view. The side block 92 is largest among the four blocks and extends up to a position on the inner side of the side block 91 in the tire radial direction.

The side block 91 is formed at a position facing the recessed portion 44A of the first shoulder block 40A in the tire radial direction with the side rib 5 in between. The side block 93 is formed at a position facing the recessed portion 54A of the second shoulder block 50A in the tire radial direction with the side rib 5 in between. The heights of side blocks arranged alongside the recessed portions 44A and 54A in the tire radial direction are decreased, whereas the heights of side blocks on both sides thereof in the tire circumferential direction are increased, and accordingly, for example, mud is more easily taken into the recessed portions 44A and 54A, which enhances the effect of improving traction performance.

As illustrated in FIGS. 18 to 20, the recessed portion 44A formed at the sidewall 43A of each first shoulder block 40A, and the recessed portion 54A formed at the sidewall 53A of each second shoulder block 50A, are recessed portions opened toward the same side in the tire circumferential direction. As described above, the sidewalls 43A and 53A of the shoulder blocks have mutually different shapes, forming irregularities in the tire circumferential direction in the buttress region 4. The recessed portions 44A and 54A have mutually similar shapes, but the recessed portion 44A is smaller than the recessed portion 54A. In other words, in each buttress region 4, the recessed portions 44A and 54A having similar shapes but different sizes are alternately arranged in the tire circumferential direction.

In the sidewall 43A of the first shoulder block 40A, an outer portion in the tire radial direction is recessed farther inward in the axial direction and an inner portion in the tire radial direction protrudes farther outward in the axial direction as compared to those of the sidewall 53A of the second shoulder block 50A. The sidewall 43A has larger difference among irregularities in the tire radial direction than the sidewall 53A and is tilted gradually in the direction from the contact area toward the side rib 5 such that the sidewall is positioned farther toward the outer side in the tire axial direction, and is also significantly curved at a position closer to the side rib 5 than to the contact area and protrudes significantly outward in the tire axial direction.

The contact area of the second shoulder block 50A is positioned farther outward in the tire axial direction than the contact area of the first shoulder block 40A. Accordingly, the outer end of the sidewall 53A in the tire radial direction is positioned farther outward in the tire axial direction than the outer end of the sidewall 43A in the tire radial direction, and is convex in the axial direction. The sidewall 53A has a small curved surface at a position close to the contact area but is a tilted surface that is tilted at a substantially constant angle from the ground contact end toward the side rib 5 except for the curved surface and a portion where the recessed portion 54A is formed.

The sidewall 43A of the first shoulder block 40A locally protrudes farther outward in the tire axial direction than the sidewall 53A of the second shoulder block 50A, but the sidewall 53A as a whole protrudes farther outward in the tire axial direction. Among these two kinds of shoulder blocks, the second shoulder block 50A has a larger volume of a portion protruding relatively outward in the tire axial direction. The recessed portion 54A of the sidewall 53A is formed to be larger than the recessed portion 44A of the sidewall 43A in a tire side view. The recessed portion 54A is longer than the recessed portion 44A in the tire circumferential direction and radial direction and widely opened in the tire circumferential direction.

As described above, in a tire side view, the edge of the recessed portion 44A includes a long side 44*x* extending long in the tire circumferential direction, and a short side 44*y* extending inward in the tire radial direction from one end of the long side 44*x*. An angle $\theta_{44}$ between the long side 44*x* and the short side 44*y* is, for example, 55° to 100°, preferably 60° to 90°, and more preferably 60° to 85°, and the long side 44*x* and the short side 44*y* are formed in a substantially L-shape. In a tire side view, the edge of the recessed portion 54A includes a long side 54*x* extending in the tire circumferential direction, and a short side 54*y* extending inward in the tire radial direction from one end of the long side 54*x*. An angle $\theta_{54}$ between the long side 54*x* and the short side 54*y* is, for example, 55° to 100°, preferably 70° to 100°, and more preferably 80° to 90°, and the long side 54*x* and the short side 54*y* are formed in a substantially L-shape.

In the present embodiment, the angle $\theta_{54}$ is slightly larger than the angle $\theta_{44}$. Since the edges of the recessed portions 44A and 54A are formed in substantially L-shapes, the number of block ends that are engaged with mud, rocks, and the like can be increased and traction performance improves. Moreover, since large force acts on a recessed portion opened in the tire circumferential direction, a tilted surface or curved surface that is gradually deeper toward the side rib 5 is preferably formed at portions adjacent to the long sides 44*x* and 54*x* in the recessed portions 44A and 54A, from the perspective of improvement of the block durability.

The recessed portions 44A and 54A are both formed at portions adjacent to the side rib 5, and accordingly, it can be said that the side rib 5 forms edges of the recessed portions 44A and 54A on the inner side in the tire radial direction. As described above, the side rib 5 is a protrusion formed in an annular shape in the tire circumferential direction and forms the boundary between the sidewall 2 and the buttress region 4. The recessed portion 44A is surrounded on three sides by the long side 44*x*, the short side 44*y* extending from one end of the long side 44*x* to the side rib 5, and the side rib 5, and is opened to the lateral groove 15A. The recessed portion 54A is surrounded on three sides by the long side 54*x*, the short side 54*y* extending from one end of the long side 54*x* to the side rib 5, and the side rib 5, and is opened to the lateral groove 14.

The long side 44*x* of the recessed portion 44A is tilted at an angle $\theta_{44x}$ (first angle) relative to a block end 40Ed at a portion adjacent to the long side 44*x*, the short side 44*y* thereof is tilted at an angle $\theta_{44y}$ (second angle) relative to a block end adjacent to the short side 44*y*, and the tilt angle $\theta_{44x}$ of the long side 44*x* is larger than the tilt angle $\theta_{44y}$ of the short side 44*y*. In the present embodiment, since the block end adjacent to the short side 44*y* is in contact with the side rib 5, the angle $\theta_{44y}$ can be regarded as the angle between the short side 44*y* and the side rib 5.

The recessed portion 44A is gradually smaller from the opening portion in the tire circumferential direction (opening portion to the lateral groove 15A) toward the short side 44*y* positioned deep inside the recessed portion 44A on the opposite side of the opening portion. Since the angle $\theta_{44x}$ of the long side 44*x* is larger than the angle $\theta_{44y}$ of the short side 44*y*, the recessed portion 44A has a large opening width in the tire circumferential direction and is gradually smaller toward the inside. Accordingly, mud entering the recessed portion 44A is compressed, and as a result, the number of engagements with muddy roads increases and traction performance improves.

The angle $\theta_{44x}$ between the long side 44$x$ and the block end 40Ed is preferably a right angle or an obtuse angle close to a right angle, and the angle $\theta_{44y}$ between the short side 44$y$ and the side rib 5 is preferably an acute angle. Specifically, the angle $\theta_{44x}$ is preferably 80° to 110° and more preferably 90° to 100°. The angle $\theta_{44y}$ is preferably 50° to 75° and more preferably 60° to 70°. In this case, the above-described effect of the recessed portion 44A becomes more pronounced.

Similarly, the long side 54$x$ of the recessed portion 54A is tilted at an angle $\theta_{54x}$ relative to a block end 50Ed at a portion adjacent to the long side 54$x$, the short side 54$y$ thereof is tilted at an angle $\theta_{54y}$ relative to the side rib 5, and the tilt angle $\theta_{54x}$ of the long side 54$x$ is larger than the tilt angle $\theta_{54y}$ of the short side 54$y$. The angle $\theta_{54x}$ is preferably an obtuse angle, and the angle $\theta_{54y}$ is preferably an acute angle. Specifically, the angle $\theta_{54x}$ is preferably 95° to 115°. The angle $\theta_{54y}$ is preferably 70° to 85°. In this case, the above-described effect of the recessed portion 54A becomes more pronounced. In the present embodiment, the angle $\theta_{54x}$ of the recessed portion 54A is larger than the angle $\theta_{44x}$ of the recessed portion 44A, and the angle $\theta_{54y}$ is larger than the angle $\theta_{44y}$.

As described above, the recessed portion 54A is longer in the tire circumferential direction and radial direction than the recessed portion 44A, and widely opened in the tire circumferential direction. The length of the recessed portion 54A in the tire circumferential direction is, for example, 19.0 mm to 40.0 mm and is 1.4 to 2.0 times larger than the length of the recessed portion 44A in the tire circumferential direction. The opening width of the recessed portion 54A to the lateral groove 14 is, for example, 8.0 mm to 20.0 mm and is 1.3 to 1.9 times larger than the opening width of the recessed portion 44A to the lateral groove 15A.

As described above, the pneumatic tire 1 having the above-described configuration is a high-performance tire that has excellent traction performance, drainage performance, durability, quietness, and steering stability. With the pneumatic tire 1, it is possible to ensure excellent traction performance during off-road driving on muddy roads, rocky terrain, sandy surfaces, and the like while effectively suppressing uneven wear of blocks of the tread pattern. The pneumatic tire 1 has an aggressive appearance and is preferable as a MT tire, a RT tire, and the like, but is quiet and has excellent steering stability during paved road driving as well, thereby achieving desirable driving.

Note that the above-described embodiment may be appropriately modified in design without departing from the scope and spirit of the present disclosure. For example, sidewalls with no side blocks may be applied to the pneumatic tire according to the present disclosure. Without side blocks, it is possible to achieve quietness improvement, air resistance reduction, and the like, but in consideration of off-road driving, it is preferable to provide side blocks.

Moreover, in the above-described embodiment, a stone ejector that is a protrusion extending along a groove to suppress stone retention is formed only in a lateral groove, but may also be formed in a tire circumferential groove. In this case as well, by forming a recessed portion at an intermediate portion of the protrusion in the length direction, it becomes easy to expel stones, thereby suppressing degradation of traction performance due to stone retention.

REFERENCE SIGNS LIST

1 pneumatic tire
2 sidewall
3 bead
4 buttress region
5 side rib
10 tread
11 center main groove
11$x$, 11$y$ bent portion
12A, 12B shoulder main groove
13A, 13B, 14, 15A, 15B lateral groove
13Ax, 13Bx, 14$x$, 15Ax bent portion
16 block group
17A, 17B stone ejector
20A, 20B first center block
20Ed block end
21A, 21B slit
21Ed opening portion
22A, 22B sipe
23A, 23B stepped portion
24A, 24B protruding portion
25A first region
26A second region
27A curved surface
28A, 28B groove bottom protrusion
29A ridge
30A, 30B second center block
31A, 31B slit
32A, 32B sipe
33A, 33B stepped portion
40A, 40B first shoulder block
40Ed block end
41A, 41B sipe
42A stepped portion
43A, 43B sidewall
44A recessed portion
44$x$ long side
44$y$ short side
45A, 45B tilted surface
46A curved surface
47A first side surface
48A second side surface
50A, 50B second shoulder block
50Ed block end
51A, 51B sipe
52A stepped portion
53A, 53B sidewall
54A recessed portion
54$x$ long side
54$y$ short side
60A, 60B stone ejector
61A first portion
62A second portion
63A recessed portion
64A, 65A tilted surface
70A, 70B stone ejector
71A first portion
72A second portion
73A recessed portion
80A, 80B stone ejector
81A first portion
82A second portion
83A recessed portion
90, 91, 92, 93 side block
CL equator
E1, E2 ground contact end
[alpha] virtual line
N1, N2, N3, N4, N5, N6, N7 normal

The invention claimed is:

1. A pneumatic tire provided with a tread pattern including first and second blocks having mutually different shapes and a groove dividing the blocks, wherein the first block includes a slit that extends from the groove and terminates in the first block, and a protruding portion that protrudes from a portion of the first block adjacent to the slit toward the outside of the first block beyond a block end of the first block on an opposite side of the slit, and the groove includes a groove bottom protrusion in which a groove bottom is raised from a portion of the groove adjacent to an opening portion of the slit, the groove bottom protrusion having one side adjacent to the opening portion of the slit and another side opposite from the opening portion of the slit ending in the groove without contacting the second block, the groove bottom protrusion extending across the opening portion of the slit and connecting to the protruding portion and further extending along the protruding portion toward a distal end of the protruding portion to form a shape that includes an L shape.

2. The pneumatic tire according to claim 1, wherein a height of the groove bottom protrusion is 5% to 50% of a depth of the groove.

3. The pneumatic tire according to claim 1, wherein at the portion of the groove bottom protrusion extending across the opening portion of the slit, the groove bottom protrusion has a width equal to or greater than 80% of the opening width of the slit.

4. The pneumatic tire according to claim 1, wherein the protruding portion has a narrowing shape with a width gradually decreasing toward the distal end.

5. The pneumatic tire according to claim 1, wherein the portion of the groove bottom protrusion extending along the protruding portion has a narrowing shape with a width gradually decreasing toward the distal end of the protruding portion.

6. The pneumatic tire according to claim 1, wherein the first block is a center block disposed closer to an equator than to a ground contact end of a tread, and the protruding portion protrudes outward in a tire axial direction.

7. The pneumatic tire according to claim 1, wherein a sidewall of the protruding portion includes a tilted surface having a larger tilt angle relative to a normal to a profile surface of a tread than other portions of a sidewall of the first block.

8. The pneumatic tire according to claim 7, wherein the tilt angle of the tilted surface is 20° to 40°.

9. The pneumatic tire according to claim 7, wherein the tilted surface is formed deeper toward a distal end of the protruding portion.

10. The pneumatic tire according to claim 7, wherein a maximum height of the tilted surface is equal to or greater than 30% of a depth of the groove.

11. The pneumatic tire according to claim 7, wherein the tilted surface is formed on both sides of the protruding portion in a width direction.

12. The pneumatic tire according to claim 7, wherein the tilted surface is formed from a distal end of the protruding portion to interior of the slit.

13. The pneumatic tire according to claim 7, wherein the first block is a center block disposed closer to an equator than to a ground contact end of a tread, and the protruding portion protrudes outward in a tire axial direction.

* * * * *